United States Patent
Majumdar et al.

(10) Patent No.: US 12,506,945 B2
(45) Date of Patent: Dec. 23, 2025

(54) NEURAL NANO-OPTICS FOR HIGH-QUALITY THIN LENS IMAGING

(71) Applicants: UNIVERSITY OF WASHINGTON, Seattle, WA (US); THE TRUSTEES OF PRINCETON UNIVERSITY, Princeton, NJ (US)

(72) Inventors: Arka Majumdar, Seattle, WA (US); Shane Colburn, Seattle, WA (US); James Whitehead, Seattle, WA (US); Luocheng Huang, Seattle, WA (US); Ethan Tseng, Seattle, WA (US); Seung-Hwan Baek, Seattle, WA (US); Felix Heide, Seattle, WA (US)

(73) Assignee: University of Washington, Seattle, WA (US)

( * ) Notice: Subject to any disclaimer, the term of this patent is extended or adjusted under 35 U.S.C. 154(b) by 194 days.

(21) Appl. No.: 18/357,919

(22) PCT Filed: Feb. 4, 2022

(86) PCT No.: PCT/US2022/015243
§ 371 (c)(1),
(2) Date: Jul. 24, 2023

(87) PCT Pub. No.: WO2022/170048
PCT Pub. Date: Aug. 11, 2022

(65) Prior Publication Data
US 2024/0334034 A1   Oct. 3, 2024

Related U.S. Application Data

(60) Provisional application No. 63/146,509, filed on Feb. 5, 2021.

(51) Int. Cl.
*H04N 23/55* (2023.01)
*G02B 1/00* (2006.01)
(Continued)

(52) U.S. Cl.
CPC .............. *H04N 23/55* (2023.01); *G02B 1/002* (2013.01); *H04N 23/56* (2023.01); *H04N 23/95* (2023.01);
(Continued)

(58) Field of Classification Search
CPC ........ H04N 23/55; H04N 23/56; H04N 23/95; G02B 1/002; G02B 2207/101; B82Y 20/00
See application file for complete search history.

(56) References Cited

U.S. PATENT DOCUMENTS

2019/0030371 A1* 1/2019 Han ..................... A61N 5/1039
2019/0113775 A1   4/2019 Jang
(Continued)

FOREIGN PATENT DOCUMENTS

KR   20200126374 A   11/2020

OTHER PUBLICATIONS

Arbabi, A. et al., "Dielectric metasurfaces for complete control of phase and polarization with subwavelength spatial resolution and high transmission," Nature Nanotechnology 10 11, 937 (2015).
(Continued)

*Primary Examiner* — Yogesh K Aggarwal
(74) *Attorney, Agent, or Firm* — Christensen O'Connor Johnson Kindness PLLC

(57) ABSTRACT

Metasurfaces and systems including metasurfaces for imaging and methods of imaging are described. In one embodiment, a method for acquiring images by an imaging system comprising a metalens includes: illuminating the metalens; acquiring light passing through the metalens as a first image by an image sensor; and processing the first image into a second image that is a deconvolved version of the first image by a post-processing engine. The metalens includes a plurality of nanoposts carried by a substrate.

15 Claims, 22 Drawing Sheets

(51) Int. Cl.
  *H04N 23/56*    (2023.01)
  *H04N 23/95*    (2023.01)
  *B82Y 20/00*    (2011.01)

(52) U.S. Cl.
  CPC ......... *B82Y 20/00* (2013.01); *G02B 2207/101* (2013.01)

(56) References Cited

U.S. PATENT DOCUMENTS

| | | |
|---|---|---|
| 2020/0134833 A1 | 4/2020 | Biswas |
| 2021/0037219 A1* | 2/2021 | Colburn ............... G02B 5/1871 |

OTHER PUBLICATIONS

Arbabi, A. et al., "Miniature optical planar camera based on a wide-angle metasurface doublet corrected for monochromatic aberrations," Nature Communications; 7:136:82; DOI: 10.1038/ncomms13682.

Aieta, F. et al., "Aberration-Free Ultrathin Flat Lenses and Axicons at Telecom Wavelengths Based on Plasmonic Metasurfaces," Nano Letters 12, 4932 (2012).

Aieta, F. et al., "Multiwavelength achromatic metasurfaces by dispersive phase compensation," Applied Optics. Science; vol. 347: Issue 6228, 1342-1346 (2015).

Avayu, O. et al., "Composite functional metasurfaces for multispectral achromatic optics," Nature Communications; 8:14992; Apr. 5, 2017; pp. 1-7; DOI: 10.1038/ncomms14992.

Wang, B. et al. "Visible-Frequency Dielectric Metasurfaces for Multiwavelength Achromatic and Highly Dispersive Holograms," Nano Lett. 2016, 16, 5235-5240; DOI: 10.1021/acs.nanolett.6b02326.

Bioucas-Dias, J. M. et al., "Total Variation-Based Image Deconvolution: a Majorization-Minimization Approach," 2006 IEEE International Conference on Acoustics Speech and Signal Processing Proceedings (IEEE, 2006), vol. 2, pp. II-II.

Boyd, S. et al., "Distributed Optimization and Statistical Learning via the Alternating Direction Method of Multipliers," Foundations and Trends in Machine Learning; vol. 3, No. 1 (2010) 1-122; DOI: 10.1561/2200000016.

Chen, W. T. et al., "A broadband achromatic metalens for focusing and imaging in the visible," Nature Nanotechnology; vol. 13, Mar. 2018, 220-226.

Chi, W. and N. George, "Electronic imaging using a logarithmic asphere," Optice Letters; Jun. 15, 2001; vol. 26, No. 12; 875-877.

Chung, H. and O. D. Miller, "High-NA achromatic metalenses by inverse design," Optics Express, vol. 28, No. 5; Mar. 2, 2020; 6945-6965.

Colburn, S. et al.. "Metasurface optics for full-color computational imaging," Sci. Adv. 2018;4: eaar2114; Feb. 9, 2018; 1-7; DOI: 10.1126/sciadv.aar2114.

Colburn, S. and A. Majumdar, "Simultaneous Achromatic and Varifocal Imaging with Quartic Metasurfaces in the Visible," ACS Photonics 2020, 7, 120-127.

Arbabi, E. et al., "Controlling the sign of chromatic dispersion in diffractive optics with dielectric metasurfaces," Optica, vol. 4, No. 6; Jun. 2017; 625-632.

Arbabi, E. et al., "Multiwavelength polarization-insensitive lenses based on dielectric metasurfaces with meta-molecules," Optive, vol. 3, No. 6; Jun. 2016; 628-633.

Engelberg, J. and U. Levy, "The advantages of metalenses over diffractive lenses," Nature Communications; (2020) 11:1991; 1-4; <https://doi.org/10.1038/s41467-020-15972-9>.

Foi, A. et al., "Practical Poissonian-Gaussian Noise Modeling and Fitting for Single-Image Raw-Data," IEEE Transactions on Image Processing, vol. 17, No. 10, Oct. 2008; 1737-1754.

Gong, D. et al. "Learning Deep Gradient Descent Optimization for Image Deconvolution," IEEE Transactions on Neural Networks and Learning Systems, vol. 31, No. 12, Dec. 2020; 5468-5482.

He, K. et al., "Deep Residual Learning for Image Recognition," 2016 IEEE Conference on Computer Vision and Pattern Recognition (CVPR) (2016), pp. 770-778.

Heide, F. et al., "Encoded diffractive optics for fullspectrum computational imaging," Scientific Reports (2016); 6:33543; DOI: 10.1038/srep33543; 1-10.

Heide, F. et al., "ProxImaL: Efficient Image Optimization using Proximal Algorithms," ACM Trans. Graph., vol. 35, No. 4, Article 84, Publication Date: Jul. 2016; 15 pages.

Hirsch, M. et al., "Efficient Filter Flow for Space-Variant Multiframe Blind Deconvolution," 2010 IEEE Computer Society Conference on Computer Vision and Pattern Recognition pp. 607-614 (2010).

Hui, M. et al., "Image restoration for synthetic aperture systems with a non-blind deconvolution algorithm via a deep convolutional neural network," Optics Express, vol. 28, No. 7; Mar. 30, 2020, 9929-9943.

Hervé Jégou, Matthijs Douze, Cordelia Schmid. Hamming Embedding and Weak Geometry Consistency for Large Scale Image Search—extended version. [Research Report] 6709, 2008, pp. 27. inria-00548651.

Johnson, J. et al., "Perceptual Losses for Real-Time Style Transfer and Super-Resolution," European Conference on Computer Vision (Springer, 2016), pp. 694-711.

Khorasaninejad, M. et al., "Achromatic Metalens over 60 nm Bandwidth in the Visible and Metalens with Reverse Chromatic Dispersion," Nano Lett. 2017, 17, 1819-1824; DOI: 10. 1021/acs.nanolett.6b05137.

Khorasaninejad, M. et al., "Metalenses at visible wavelengths: Diffraction-limited focusing and subwavelength resolution imaging," Science; Applied Optics; Jun. 3, 2016, vol. 352 Issue 6290; 1190-1195; DOI: 10.1126/science.aaf6644.

Kingma, D. P. and M. Welling, "Auto-Encoding Variational Bayes," CoRR abs/1312.6114 (2014); 1-14.

Krishnan, D. and Fergus, R., "Fast Image Deconvolution using Hyper-Laplacian Priors," , Advances in neural information processing systems (2009), pp. 1033-1041.

Kupyn, O. et al., "DeblurGAN: Blind Motion Deblurring Using Conditional Adversarial Networks," IEEE Conference on Computer Vision and Pattern Recognition (CVPR) (2018); 1-10.

Lin, D. et al., "Dielectric gradient metasurface optical elements," Science; Research; Jul. 18, 2014, vol. 345, Issue 6194; 298-303; DOI: 10.1126/science.1253213.

Mansouree, M. et al., "Multifunctional 2.5D metastructures enabled by adjoint optimization," Optica; vol. 7, No. 1, Jan. 2020; 77-84.

International Search Report and Written Opinion of the International Searching Authority mailed on Jun. 14, 2022, issued in the corresponding International Application No. PCT/US22/15243, filed on Feb. 4, 2022; 8 pages.

Peng, Y. et al., "Learned Large Field-of-View Imaging With Thin-Plate Optics," ACM Trans. Graph., vol. 38, No. 6, Article 1. Publication date: Nov. 2019; 14 pages.

Peng, Y. et al., "The Diffractive Achromat Full Spectrum Computational Imaging with Diffractive Optics," Optics express 23 24, 31393 (2015); DOI: http://dx.doi.org/10.1145/2992138.2992145.

Presutti, F. and F. Monticone, "Focusing on bandwidth: achromatic metalens limits," Optica, vol. 7, No. 6, Jun. 2020; 624-631 <https://doi.org/10.1364/OPTICA.389404>.

Reeves, Stanley J., "Fast Image Restoration Without Boundary Artifacts," IEEE Transactions on Image Processing, vol. 14, No. 10, Oct. 2005; 1448-1453.

Richardson, William Hadley, "Bayesian-Based Iterative Method of Image Restoration," Journal of the Optical Society of America, vol. 62, No. 1, Jan. 1972; 55-59.

Ronneberger, O. et al., "U-Net: Convolutional Networks for Biomedical Image Segmentation," MICCAI (2015); 8 pages.

Shalaginov, M. Y. et al., "Single-layer Planar Metasurface Lens with >170☐ Field of View," Frontiers in Optics/Laser Science; APS/DLS p. FM4C.1 (2019).

Shrestha, S. et al., "Broadband achromatic dielectric metalenses," Light: Science & Applications ( 2018)7 :85; 1-11; DOI 10.1038/s41377-018-0078-x.

Sitzmann, V. et al., "End-to-end Optimization of Optics and Image Processing for Achromatic Extended Depth of Field and Super-

(56) References Cited

OTHER PUBLICATIONS resolution Imaging," ACM Trans. Graph., vol. 37, No. 4, Article 114. Publication date: Aug. 2018; 1-13.
Bartholmai, M. et al., "Monitoring of Hazardous Scenarios using Multi-Sensor Devices and Sensor Data Fusion," International Journal on Advances in Systems and Measurements, issn 1942-261x; vol. 7, No. 3 & 4, year 2014,; 193-267; <http://www.iariajournals.org/systems_and_measurements/>.
Sun, Q. et al., "Learning Rank-1 Diffractive Optics for Single-shot High Dynamic Range Imaging," IEEE Conference on Computer Vision and Pattern Recognition (CVPR) (2020); 1386-1396.
Tseng, E. et al., "Neural nano-optics for high-quality thin lens imaging," Nature Communications (2021) 12:6493; 1-7; <https://doi.org/10.1038/s41467-021-26443-0>.
Wang, S. et al., "A broadband achromatic metalens in the visible," Nature Nanotechnology, vol. 13; Mar. 2018; 272-232.
International Preliminary Report on Patentability and Written Opinion mailed Aug. 17, 2023, issued in corresponding international Application No. PCT/US2022/015243, filed Feb. 4, 2022, 7 pages.
White, A. et al., "A Silicon Photonics Computational Lensless Active-Flat-Optics Imaging System," Scientific Reports (2020) 10:1689, pp. 1-9 <https://doi.org/10.1038/s41598-020-58027-1>.
Williams, R. J. "Simple Statistical Gradient-Following Algorithms for Connectionist Reinforcement Learning," Machine Learning, 8, 229-256 (1992), pp. 5-32.
Wang, Y. et al., "Electromagnetic diffraction theory of refractive axicon lenses," vol. 34, No. 7 / Jul. 2017 / Journal of the Optical Society of America A, pp. 1201-1211.
Yu, N. and F. Capasso, "Flat optics with designer metasurfaces," Nature Materials, vol. 13, Feb. 2014, pp. 139-150; DOI: 10.1038/NMAT3839.
Wang, Z. et al., "Image Quality Assessment: From Error Visibility to Structural Similarity," IEEE Transactions on Image Processing, vol. 13, No. 4, Apr. 2004, pp. 600-613.
Zhang, R. et al., "The Unreasonable Effectiveness of Deep Features as a Perceptual Metric," IEEE International Conference on Computer Vision and Pattern Recognition (2018).
Zheng, G. et al., "Metasurface holograms reaching 80% efficiency," Nature Nanotechnology; Published Online Feb. 23, 2015, DOI: 10.1038/NNANO.2015.2.
Peng, Y. et al., "Computational imaging using lightweight diffractive-refractive optics," Nov. 30, 2015, vol. 23, No. 24; DOI: 10.1364/OE.23.031393 | Optics Express 31393-31407.
Supplementary European Search Report mailed Nov. 12, 2024, issued in corresponding European Application No. EP 22750436.2, filed Feb. 4, 2022, 7 pages.
Colburn, Shane; "Design of computational imaging systems using wavefront-coded dielectric metasurfaces"; Dec. 31, 2020; Retrieved from the Internet: URL:https ://digital.lib.washington.edu /server/api/core/bitstreams/92c52cl6-126d-44a7-9373-cba4b19e59db/con tent; Retrieved on Jan. 22, 2024; 157 pages; ProQuest LLC; Ann Arbor, MI.
Zhelyeznyakov et al.; "Metasurface Computational Imaging"; Proc. SPIE Priceedungs; Mar. 4, 2019; pp. 109280J-1 through 109280J-6; vol. 10928; ISSN 0277-786X], SPIE, US.
Korean Office Action for KR Application No. 10-2023-7028823 (with English Translation)1, filed Aug. 24, 2023; 17 pages total.

\* cited by examiner

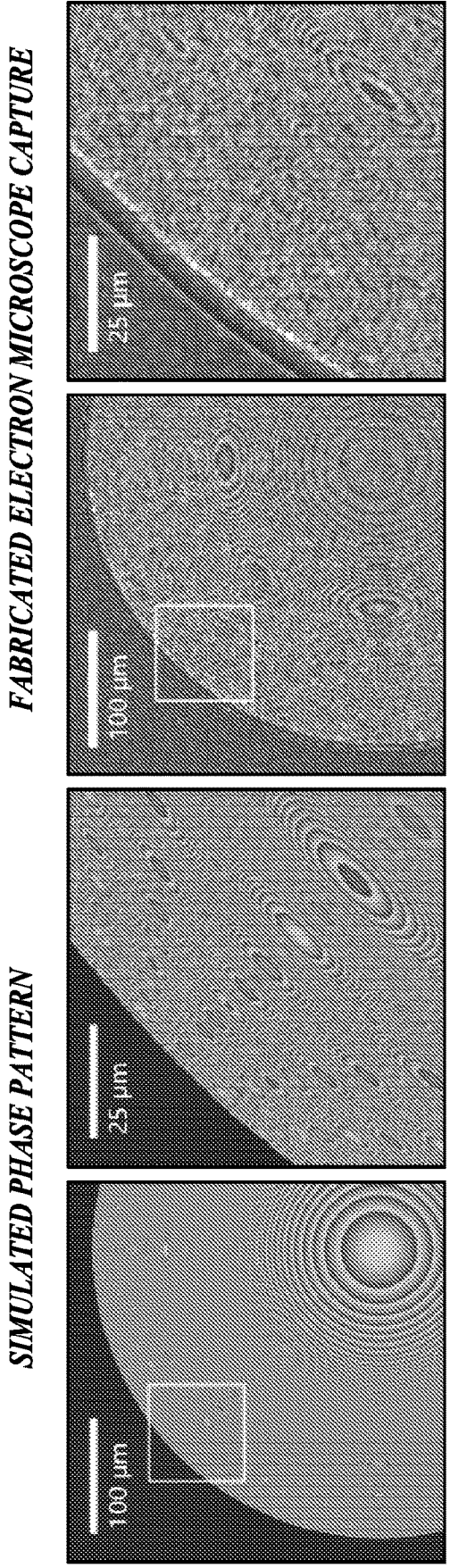

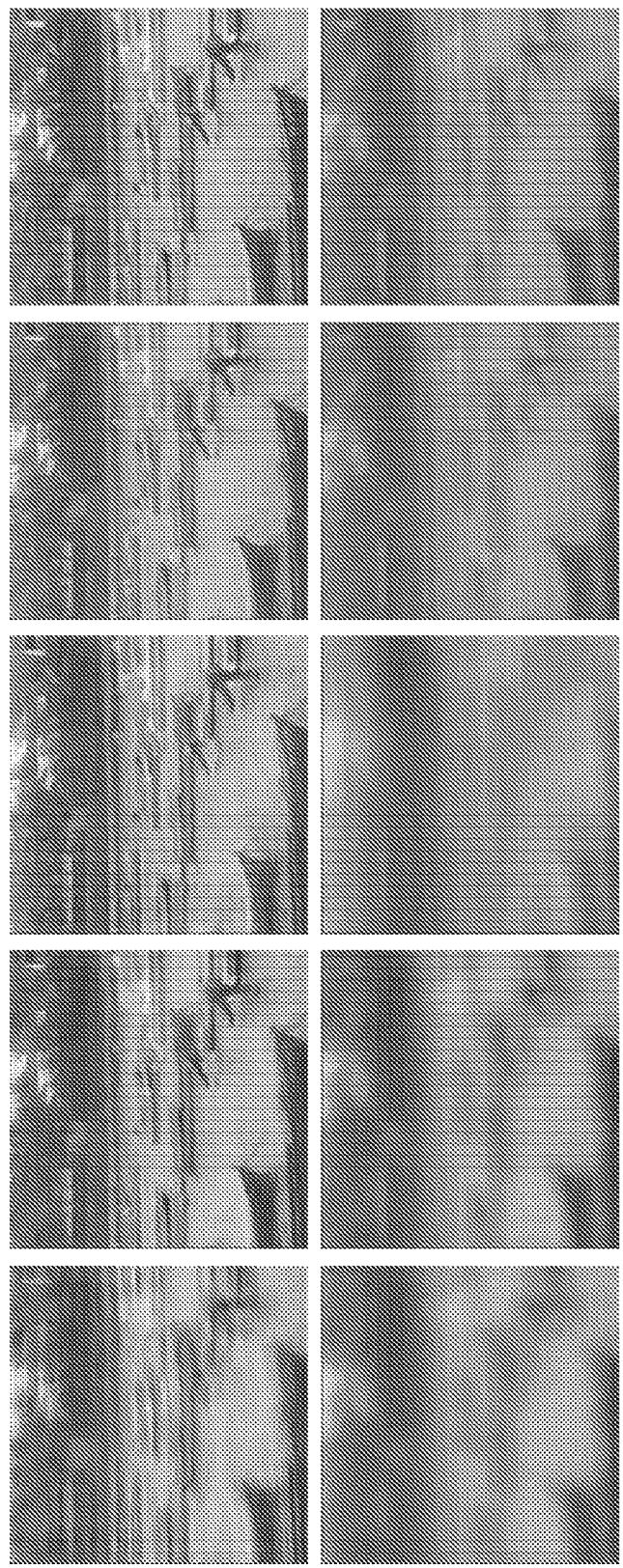

NEURAL NANO-OPTICS FOR HIGH-QUALITY THIN LENS IMAGING

CROSS-REFERENCE TO RELATED APPLICATION

This application is a National Stage of International Application No. PCT/US2022/015243filed Feb. 4, 2022, which claims the benefit of U.S. Patent Application No. 63/146,509, filed Feb. 5, 2021, the disclosure of which is hereby incorporated by reference in its entirety.

STATEMENT OF GOVERNMENT LICENSE RIGHTS

This invention was made with government support under Grant No. 140D0420C0060, awarded by the Defense Advanced Research Projects Agency and Grant No. 2047359, awarded by the National Science Foundation. The government has certain rights in the invention.

BACKGROUND

The miniaturization of intensity sensors in recent decades has made today's cameras ubiquitous across many application domains, including medical imaging, commodity smartphones, security, robotics, and autonomous driving. However, only imagers that are an order of magnitude smaller than the typical cameras could enable novel applications in nano-robotics, in vivo imaging, AR/VR, and health monitoring. While sensors with sub-micron pixels exist now, further miniaturization is not possible because of fundamental limitations of conventional optics. Traditional systems consist of a cascade of refractive elements that correct for aberrations, and these bulky lenses impose a lower limit on camera footprint. A further fundamental barrier is the difficulty of reducing focal length, as this induces greater chromatic aberrations.

Some dispersion-engineered metasurfaces aim to mitigate the shortcomings of the conventional metasurfaces by exploiting group delay and group delay dispersion to focus broadband light, but this technique is fundamentally limited, constraining designs to apertures of about 10's of microns. As such, existing approaches have not been able to increase the achievable aperture sizes without significantly reducing the numerical aperture or supported wavelength range. Other attempted solutions only suffice for discrete wavelengths or narrow-band illumination.

Metasurfaces also exhibit strong geometric aberrations that have limited their utility for wide field-of-view (FOV) imaging. Approaches that support wide FOV typically rely on either small input apertures that limit light collection or use multiple metasurfaces, which drastically increases fabrication complexity. Moreover, these multiple metasurfaces are separated by a gap that scales linearly with the aperture, thus obviating the size benefit of meta-optics as the aperture increases.

Recently, researchers have leveraged computational imaging to offload aberration correction to post-processing software. Although these approaches enable full-color imaging metasurfaces without stringent aperture limitations, they are limited to a FOV below 20° and the reconstructed spatial resolution is an order of magnitude below that of conventional refractive optics.

Researchers in the conventional technology have similarly proposed camera designs that utilize a single optic instead of compound stacks, but these systems fail to match the performance of commodity imagers due to low diffraction efficiency. Moreover, the most successful approaches hinder miniaturization because of their long backfocal distances of more than 10 mm. Lensless cameras instead reduce size by replacing the optics with amplitude masks, but this severely limits spatial resolution and requires long acquisition times.

Nano-optic imagers that modulate light at sub-wavelength scales could unlock unprecedented applications in diverse domains ranging from robotics to medicine. Although metalenses offer a path to such ultra-small imagers, existing methods have achieved image quality far worse than bulky refractive alternatives, being fundamentally limited by aberrations at large apertures and low f-numbers.

Accordingly, system and methods are required for improved imaging using ultra-small imagers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Toward this end, the present disclosure provides a fully differentiable learning method that combines a metasurface physical structure in conjunction with a novel, neural feature-based image reconstruction algorithm. Experimentally validating the inventive method, an order of magnitude lower reconstruction error is achieved. In some embodiments, a high-quality, nanooptic imager combines the widest field of view for full-color metasurface operation while simultaneously achieving a largest demonstrated 0.5 mm, f/2 aperture.

In some embodiments of the inventive technology, neural meta-optics leverages a learned design method that overcomes the limitations of existing techniques. In contrast to previous works that rely on hand-crafted designs, the inventive technology co-optimizes the metasurface and deconvolution algorithm with an end-to-end differentiable model of image formation and computational reconstruction. The inventive model exploits a memory-efficient differentiable nano-scatterer model, as well as a novel, neural feature-based reconstruction architecture. The inventive technology departs from the inverse-designed meta-optics in that the embodiments of the present technology support larger aperture sizes and directly optimize the quality of the final image as opposed to intermediate metrics such as the focal spot intensity. Although end-to-end optimization of DOEs has been explored in the past, existing methods using phase plates assume shift-invariant systems and only support small field of views (FOVs) of about 5°. Furthermore, existing learned deconvolution methods are only minor variations of standard encoder-decoder architectures, such as the U-Net, and often fail to generalize to experimental measurements or handle large spatially-dependent aberrations, as normally found in metasurface images.

With the inventive neural meta-optics, the embodiments of the inventive technology achieve a high-quality, polarization-insensitive nano-optic imager for full-color (400 nm to 700 nm), wide FOV (40°) imaging with an f-number of, for example, 2. As a nonlimiting example, with 500 μm aperture, we optimized 1.6×106 nano-scatterers, which is an order of magnitude greater than existing achromatic meta-optics. Compared to all existing heuristically designed metasurfaces and metasurface computational imaging approaches, the embodiments of the inventive technology outperform existing methods by an order of magnitude in reconstruction error outside the nominal wavelength range on experimental captures.

In one embodiment, a method for acquiring images by an imaging system having a metalens includes: illuminating the metalens; acquiring light passing through the metalens as a first image by an image sensor; and processing the first image into a second image that is a deconvolved version of the first image by a post-processing engine. The metalens includes a plurality of nanoposts carried by a substrate.

In one aspect, the method also includes comparing a ground truth image to the second image by the post-processing engine.

In one aspect, the method also includes determining image gradients based on comparing the ground truth image to the second image.

In another aspect, the post-processing engine includes a feature deconvolution block.

In one aspect, the method also includes training the feature deconvolution block based on the image gradients.

In one aspect, the feature deconvolution block is at least in part based on a neural deconvolution ($f_{DECONV}$) that utilizes a feature propagation scheme:

$$f_{DECONV}(I) = f_{DE}(f_{Z \to W}(f_{FE}(I)))$$

where $f_{FE}$ and $f_{DE}$ both include convolutional neural networks (CNN) and their optimizable parameters, and I refers to the first image.

In one aspect, the post-processing engine is a neural network engine.

In one aspect, the method also includes calibrating the metalens based on point spread function (PSF).

In one aspect, calibrating the metalens based on the PSF is based on artificial images. In one aspect, calibrating the metalens based on the PSF comprises phase function q as a function of distance r from an optical axis:

$$\phi(r) = \sum_{i=0}^{n} a_i \left(\frac{r}{R}\right)^{2i}$$

where $\{\alpha_0, \ldots \alpha_n\}$ are optimizable coefficients, R is a phase mask radius, and n is a number of polynomial terms.

In one aspect, the nanoposts comprise silicon nitride.

In one aspect, the nanoposts have a diameter (d) in a range from 100 nm to 300 nm and a height (t) in a range from 500 nm to 800 nm.

In one embodiment, an imaging system includes: a metalens having a plurality of nanoposts carried by a substrate; a source of light configured to emit light toward the metalens; an image sensor configured to acquire light passing through the metalens as a first image; and a post-processing engine configured for processing the first image into a second image that is a deconvolved version of the first image.

In one aspect, the post-processing engine is further configured for comparing a ground truth image to the second image.

In one aspect, comparing the ground truth image to the second image includes determining image gradients.

In one aspect, processing the first image light into the second image includes a gradient decent method.

In one aspect, the post-processing engine is a machine learning engine.

In one aspect, the metalens is configured for calibration based on experimental point spread functions (PSFs).

In one aspect, the nanoposts include silicon nitride.

In one aspect, the nanoposts have a diameter (d) in a range from 100 nm to 300 nm and a height (t) in a range from 500 nm to 800 nm.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 4A-4D illustrate characterization of the imaging metasurfaces according to embodiments of the present technology.

DETAILED DESCRIPTION

Disclosed herein are metasurfaces and systems including metasurfaces. Such metasurfaces may be formed on a substrate from a plurality of posts. The metasurfaces are configured to be optically active over a defined wavelength range and in certain embodiments are configured to form lenses.

Figure 1:
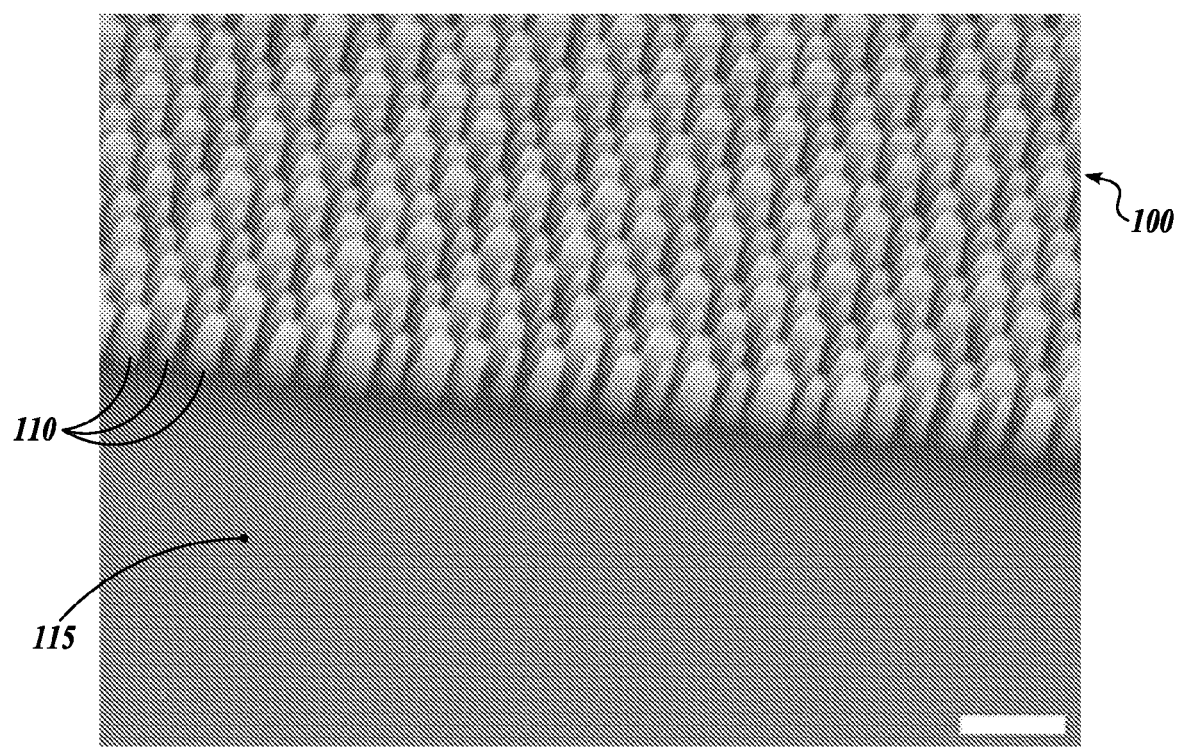
FIG. 1 is a scanning electron micrograph image of a metalens in accordance with an embodiment of the present technology.

FIG. 1 is an optical image of a metalens in accordance with an embodiment of the present technology. Illustrated metalens 100 includes a number of nanostructures (also referred to as "nanoposts" or "scatterers") 110 that are carried by a substrate (also referred to as a "carrier") 115. The nanostructures 110 may be nanoscale structures that are generally cylindrical and characterized by one or more characteristic scales (e.g., cylinder diameter d). In some embodiments, the nanostructures 110 may have different sizes, as illustrated in FIG. 1. In different embodiments, the metalens 100 may be manufactured by the process described below.

In some embodiments, during the manufacturing of the metalens 100, a 600 nm layer of silicon nitride is first deposited via plasma-enhanced chemical vapor deposition (PECVD) on a quartz substrate, followed by spin-coating with a high-performance positive electron beam resist (e.g., ZEP-520A). An 8 nm Au/Pd charge dissipation layer is then sputtered followed by subsequent exposure to an electron-beam lithography system (e.g., JEOL JBX6300FS). The Au/Pd layer may then be removed with a thin film etchant (e.g., type TFA gold etchant), and the samples may be developed in amyl acetate. In some embodiments, to form an etch mask, 50 nm of aluminum is evaporated and lifted off via sonication in methylene chloride, acetone, and isopropyl alcohol. The samples are then dry etched using a CHF3 and SF6 chemistry and the aluminum is removed by immersion in AD-10 photoresist developer.

Figure 2A:
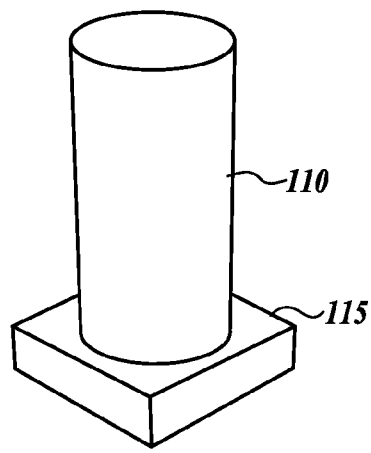
FIGS. 2A-2C illustrate several views of metalens' nanoposts in accordance with embodiments of the present technology.
Figure 2B:
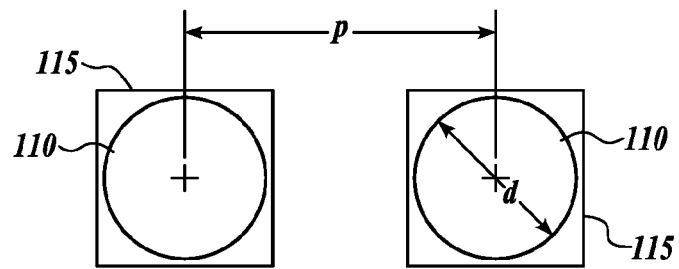
Figure 2C:
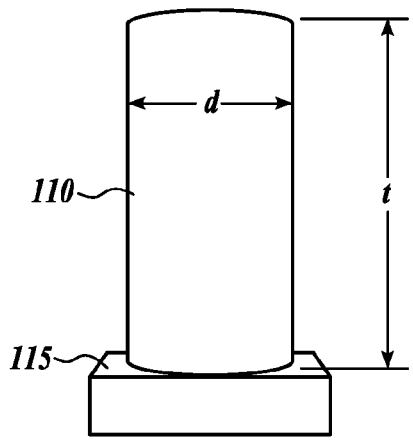

FIGS. 2A-2C illustrate several views of metalens' nanoposts in accordance with embodiments of the present technology. FIG. 2A is an isometric view of a nanopost 110 that is carried by a substrate 115. The illustrated nanopost 110 is cylindrical, but in other embodiments the nanopost 110 may have other shapes, for example, an elliptical cross-section, a square cross-section, a rectangular cross-section or other cross-sectional shape that maintain center-to-center spacing at a sub-wavelength value. FIG. 2B is a top view of two adjacent nanoposts that are separated by a distance "p" (pitch). Only two nanoposts are illustrated in FIG. 2B for simplicity. However, for a practical metalens 100, many more nanoposts are distributed over the substrate 115. FIG. 2C is a side view of a nanopost 110 that is carried by a substrate 115. In some embodiments, the nanoposts (scatterers) 110 are made of silicon nitride due to its broad transparency window and CMOS compatibility.

The illustrated nanoposts 110 are characterized by a height "t" and diameter "d". In some embodiments, the values of "d" may range from about 100 nm to about 300 nm. Generally, the value of "t" (height) is constant (within the limits of manufacturing tolerance) for all diameters "d" for a given metalens. In some embodiments, the values of "t" may range from about 500 nm to about 800 nm. The nanoposts (scatterers) may be polarization-insensitive cylindrical nanoposts 110 arranged in a square lattice on a quartz substrate 115. The phase shift mechanism of these nanoposts arises from an ensemble of oscillating modes within the nanoposts that couple amongst themselves at the top and bottom interfaces of the post. By adjusting the diameter "d" of the nanoposts, the modal composition varies, modifying the transmission coefficient through the nanoposts.

Differentiable Metasurface Proxy Model

Figure 3A:
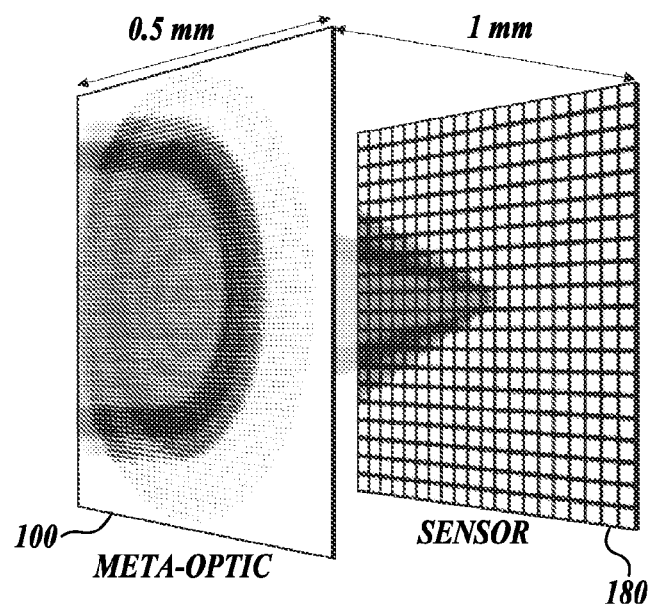
FIGS. 3A-3E illustrates design, simulation, and fabrication of ultrathin meta-optic according to embodiments of the present technology.
Figure 3B:
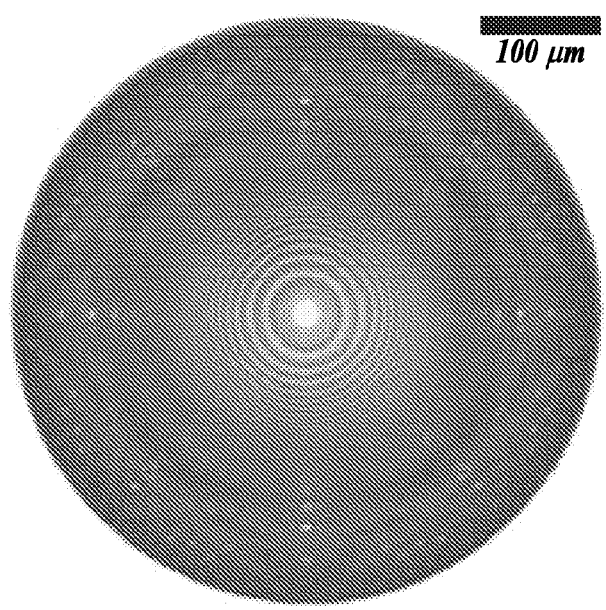
Figure 3C:
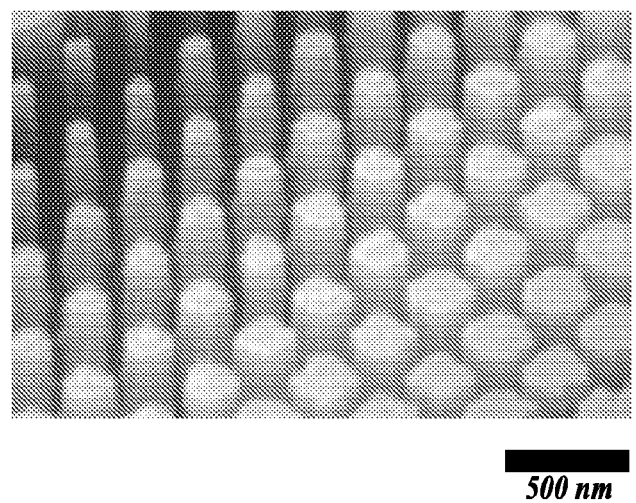
Figure 3D:
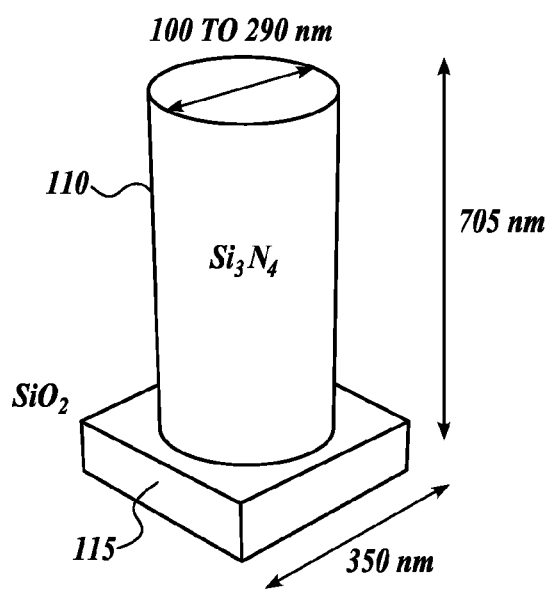

FIGS. 3A-3E illustrate design, simulation, and fabrication of ultrathin meta-optic. In some embodiments, the learned, ultrathin meta-optic 100 as shown in FIG. 3A is 500 μm in thickness and diameter, allowing for the design of a miniature camera. A manufactured optic (sensor) 180 is shown in FIG. 3B. A zoom-in is shown in FIG. 3C, and nanopost dimensions are shown in FIG. 3D for the representative nanoposts 110.

FIG. 3C shows fabricated nanoposts 110. In some embodiments, beginning with a double side polished fused silica wafer, we deposit 705 nm of silicon nitride via plasma-enhanced chemical vapor deposition to form our device layer. We then spin coat with ZEP 520A resisit and sputter an 8 nm gold charge dissipation layer followed by exposure with a JEOL JBX6300FS electron-beam lithography system at 100 kV and 8 nA. After stripping the gold, we develop in amyl acetate followed by immersion in isopropyl alcohol. To define the etch mask, we evaporate 50 nm of aluminum and lift off via sonication in methylene chloride, acetone, and isopropyl alcohol. We then etch the silicon nitride layer using a CHF3 and SF6 chemistry with an inductively coupled plasma etcher. Following stripping of the aluminum etch mask, we coat and pattern AZ 1512 photoresist on the chip, followed by aluminum evaporation and lift off in order to define a hard aperture to block stray light.

Figure 3E:
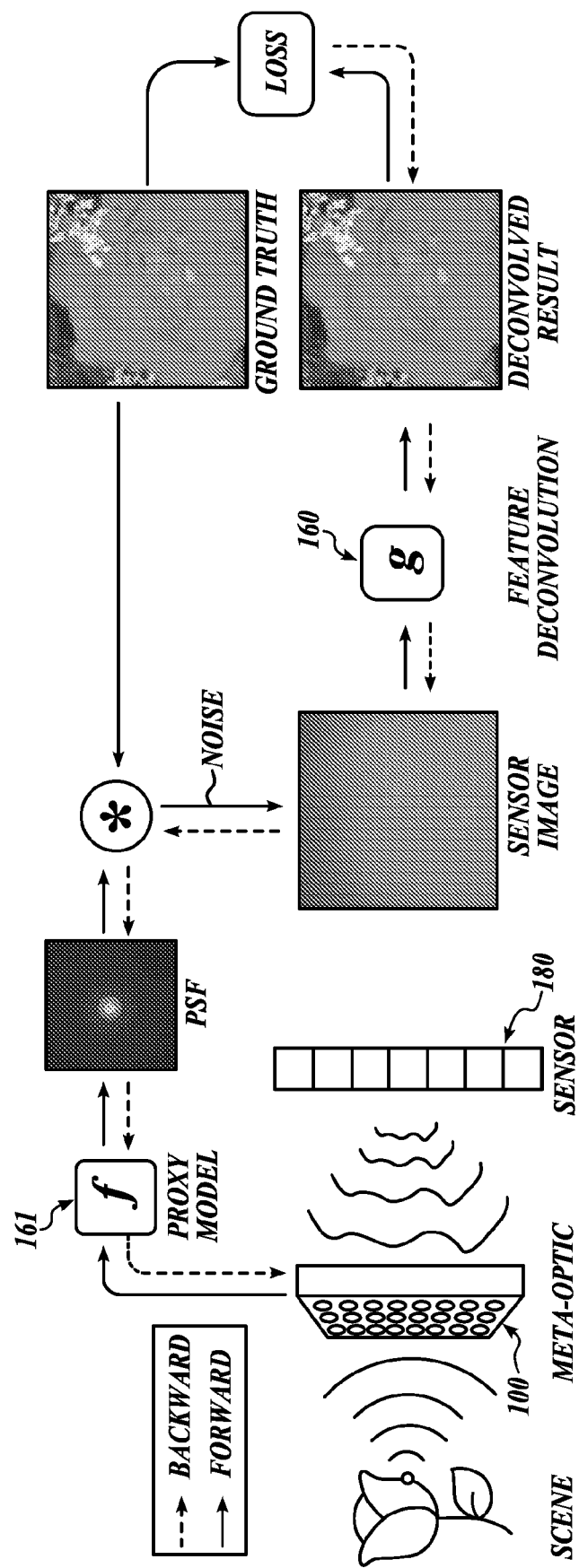

The end-to-end imaging pipeline shown in FIG. 3E is composed of the inventive efficient metasurface image formation model and the feature-based deconvolution algorithm that is executable by a feature deconvolution engine 160 (for example, a general purpose computer or a controller) based on a proxy model 161. From the optimizable phase profile our differentiable model produces spatially-variant point spread functions (PSFs), which are then patch-wise convolved with the input image to form the sensor measurement. The sensor 180 reading is then deconvolved using our algorithm to produce the final image.

The inventive differentiable metasurface image formation model in FIG. 3E consists of three sequential stages that utilize differentiable sensor operations: metasurface phase determination (see FIG. 7), PSF simulation and convolution, and sensor noise. In our model, polynomial coefficients that determine the metasurface phase are optimizable variables, whereas experimentally calibrated parameters characterizing the sensor readout and the sensor-metasurface distance are fixed.

The optimizable metasurface phase function q as a function of distance r from the optical axis is given by:

$$\phi(r) = \sum_{i=0}^{n} a_i \left(\frac{r}{R}\right)^{2i}, \tag{1}$$

where the {a0, ... an} are optimizable coefficients, R is the phase mask radius, and n is the number of polynomial terms. We optimize the metasurface in this phase function basis as opposed to a pixel-by-pixel manner to avoid local minima. This phase, however, is defined for a single, nominal design wavelength, which is a fixed hyper-parameter in our optimization. While this mask alone is sufficient for modeling monochromatic light propagation, we require the phase at all target wavelengths to design for a broadband imaging scenario.

To this end, at each position in our metasurface we apply two sequential operations. The first operation is an inverse, phase-to-structure mapping that computes the scatterer geometry given the desired phase at the nominal design wavelength. With the scatterer geometry determined, we can then apply a forward, structure-to-phase mapping to calculate the phase at the remaining target wavelengths. Leveraging an effective index approximation that ensures a unique geometry for each phase shift in the 0 to 2π range, we ensure differentiability, and can directly optimize the phase coefficients by adjusting the scatterer dimensions and computing the response at different target wavelengths.

These phase distributions that are differentiably determined from the nano-scatterers allow us to then calculate the point spread function (PSF) as a function of wavelength and field angle to efficiently model full color image formation over the whole field of view (FOV). Finally, we simulate sensing and readout with experimentally calibrated Gaussian and Poisson noise by using the reparameterization and score-gradient techniques to enable backpropagation.

When compared directly against alternative computational forward simulation methods, such as finite-difference time-domain (FDTD) simulation, our technique is approximate, but is more than three orders of magnitudes faster and more memory efficient. For the same aperture as our design, FDTD simulation would require on the order of 30 terabytes for accurate meshing alone. Our technique instead only scales quadratically with length. This enables our entire end-to-end pipeline to achieve a memory reduction of over 3000×, with metasurface simulation and image reconstruction both fitting within a few gigabytes of GPU RAM.

The inventive technology relies on a neural deconvolution method that incorporates learned priors while generalizing to unseen test data. Specifically, we design a neural network architecture that performs deconvolution on a learned feature space instead of on raw image intensity. This technique combines both the generalization of model-based deconvolution and the effective feature learning of neural networks, allowing us to tackle image deconvolution for meta-optics with severe aberrations and spatially large PSFs. This approach generalizes well to experimental captures even when trained only in simulation.

The inventive reconstruction network architecture includes three stages: a multi-scale feature extractor $f_{FE}$, a propagation stage $f_{Z \to W}$ that deconvolves these features (i.e., propagates features Z to their deconvolved spatial positions W), and a decoder stage $f_{DE}$ that combines the propagated features into a final image. Formally, our feature propagation network performs the following operations:

$$\underset{\downarrow}{\text{Feature Propagation}} \quad (2)$$

$$O = f_{DE}(f_{Z \to W}(f_{FE}(I), PSE)).$$

$$\underset{\text{Decoder}}{\uparrow} \quad \underset{\text{Feature Extraction}}{\uparrow}$$

where I is the raw sensor measurement and O is the output image.

Both the feature extractor and decoder are constructed as fully convolutional neural networks. The feature extractor identifies features at both the native resolution and multiple scales to facilitate learning low-level and high-level features, allowing us to encode and propagate higher-level information beyond raw intensity. The subsequent feature propagation stage $f_{Z \to W}$ then propagates the features to their inverse-filtered positions using a differentiable deconvolution method. Finally, the decoder stage then converts the propagated features back into image space, as further described below. When compared against existing state-of-the-art deconvolution approaches we achieve over 4 dB SNR improvement (more than 2.5× reduction in mean square error) for deconvolving challenging metasurface-incurred aberrations.

Both our metasurface image formation model and our deconvolution algorithm are incorporated into a fully differentiable, end-to-end imaging chain. Our metasurface imaging pipeline allows us to apply first-order stochastic optimization methods to learn metasurface phase parameters $P_{META}$ and parameters $P_{DECONV}$ for our deconvolution network $f_{DECONV}$ that will minimize our endpoint loss function L, which in our case is a perceptual quality metric. Our image formation model is thus defined as:

$$O = f_{DECONV}(\mathcal{P}_{DECONV}, f_{SENSOR}(I * f_{META}(\mathcal{P}_{META})), f_{META}(\mathcal{P}_{META}))), \quad (3)$$

where I is an RGB training image, $f_{META}$ generates the metasurface PSF from $P_{META}$, * is convolution, and $f_{SENSOR}$ models the sensing process including sensor noise. Since our deconvolution method is non-blind, $f_{DECONV}$ takes in $f_{META}$ ($P_{META}$). In some embodiments, training the feature deconvolution block is based on the method of image gradients. We then solve the following optimization problem:

$$\{\mathcal{P}^*_{META}, \mathcal{P}^*_{DECONV}\} = \underset{\{\mathcal{P}_{META}, \mathcal{P}_{DECONV}\}}{\arg\min} \sum_{i=1}^{M} \mathcal{L}(O^{(i)}, I^{(i)}). \quad (4)$$

The final learned parameters $P^*_{META}$ are used to manufacture the meta-optic and $P^*_{DECONV}$ determines the deconvolution algorithm.

Characterizing Nano-Optics Performance

Through our optimization process, our meta-optic learns to produce compact spatial PSFs that minimize chromatic aberrations across all color channels. Unlike designs that exhibit a sharp focus for a single wavelength but significant aberrations at other wavelengths, our optimized design strikes a balance across wavelengths to facilitate full-color imaging. Furthermore, the learned metasurface avoids the spatially large PSFs used previously for computational imaging. It can be observed that the PSF for our optimized metaoptic exhibits a combination of compact shape and minimal variance across field angles, as expected for our design. PSFs for a traditional hyperbolic metalens (511 nm) instead have significant spatial variation across field angles and severe chromatic aberrations that cannot be compensated through deconvolution. We also show corresponding modulation transfer functions (MTFs) for our design. The MTF does not change appreciably with incidence angle and also preserves a broad range of spatial frequencies across the visible spectrum.

Imaging Demonstration

To account for manufacturing imperfections, we perform a PSF calibration step where we capture the spatial PSFs using the fabricated optics. We then fine tune our deconvolution network by replacing the proxy-based metasurface simulator with the captured PSFs. This finetuning calibration step does not train on experimental captures, we only require the measured PSFs, without requiring experimental collection of a vast image dataset. Our full computational reconstruction pipeline runs at real-time rates and requires only 60 ms to process a 720 px×720 px RGB capture. High-quality, full-color image reconstructions using our neural nano-optic are shown in the Figures below. We perform comparisons against a traditional hyperbolic metalens designed for 511 nm and the conventional cubic metalens. Additional comparisons against alternative single-optic and metalens designs are also shown in the Figures and discussed below. Ground truth images are acquired using a six-element compound optic that is 550000× larger in volume than the meta-optics.

The traditional hyperbolic metalens experiences severe chromatic aberrations at larger and shorter wavelengths. The cubic metalens maintains better consistency across color channels, but suffers from artifacts owing to its large, asymmetric PSF. In contrast, we demonstrate high-quality images without these aberrations, as demonstrated in the fine details of the Figures that illustrate our results below. We quantitatively validate the inventive neural nanooptic by measuring reconstruction error on unseen test set of natural images, on which we obtain 10×lower mean-squared error than existing approaches. In addition to natural image reconstruction, we also measured the spatial resolution using standard test charts. Our nano-optic imager achieves an image-side spatial resolution of 214 lp/mm across all color channels at 120 mm object distance. We improve spatial resolution by an order of magnitude over the previous state-of-the-art, which achieved 30 lp/mm.

Specifically, the inventive learned imaging method allows for an order of magnitude lower reconstruction error on experimental data than existing works. The key enablers of this result are our differentiable meta-optical image formation model and novel deconvolution algorithm. Combined together as a differentiable end-to-end model, we jointly optimize the full computational imaging pipeline with the only target metric being the quality of the deconvolved RGB image—sharply deviating from existing methods that penalize focal spot size in isolation from the reconstruction method.

FIGS. 4A-4D illustrate characterization of the imaging metasurfaces according to embodiments of the present technology. In the illustrated embodiment, the inventive learned meta-optic is fabricated using electron-beam lithography and dry etching, and the corresponding measured PSFs, simulated PSFs, and simulated MTFs are shown.

Before capturing images, we first use the fabricated optics to capture spatial PSFs to account for fabrication inaccuracies. Nevertheless, the match between the simulated PSFs and the captured PSFs demonstrates the accuracy of our metasurface proxy model, as shown in the simulation results below. In contrast, the PSFs of the traditional meta-optic and the cubic design demonstrate severe chromatic aberrations at the red and blue wavelengths and across the different field angles. The inventive learned design maintains consistent PSF shape across the visible spectrum and for all field angles across the FOV, facilitating downstream deconvolution and the final image reconstruction.

Figure 5:
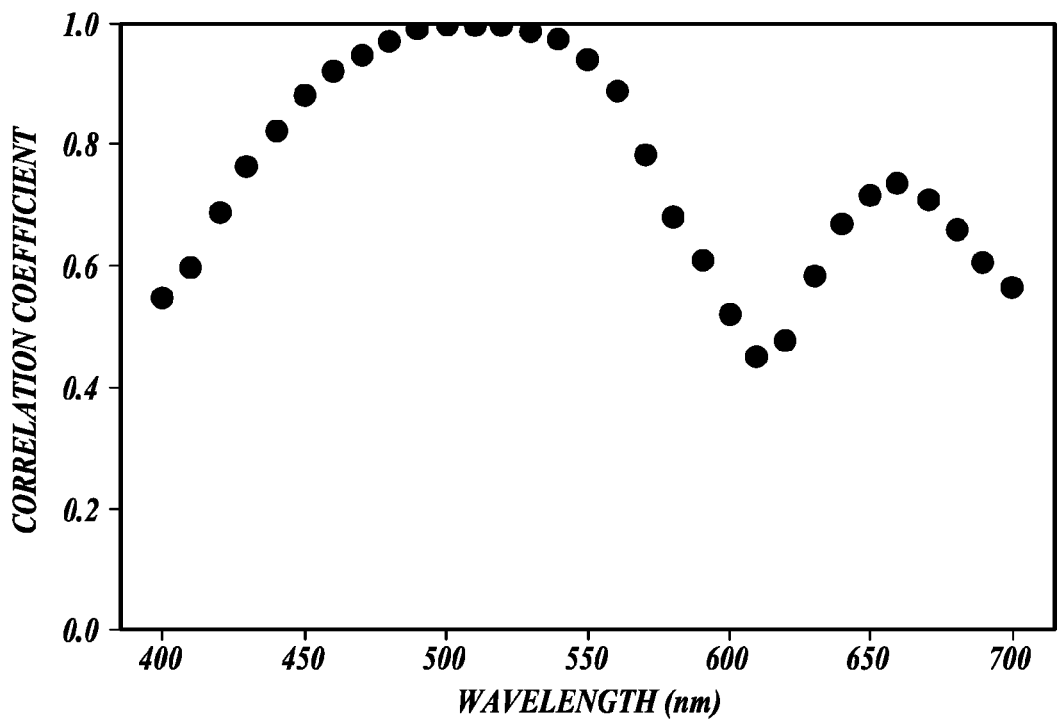
FIG. 5 illustrates simulated PSF correlation coefficient for our neural nano-optic according to embodiments of present technology.

FIG. 5 illustrates simulated PSF correlation coefficient for our neural nano-optic according to embodiments of present technology. In this simulated case, the range over which the coefficient exceeds 0.5 determines the operating bandwidth. In the illustrated embodiment, the design supports imaging over the visible spectrum from 400 nm-700 nm.

This operating bandwidth is evaluated by computing the PSF's correlation coefficient with wavelength and defining the bandwidth as the range across which the coefficient remains above 0.5. This metric informs us how similar the PSF is as a function of wavelength, which is critical given that the PSF can only be experimentally calibrated at discrete wavelengths even if broadband light is captured by the meta-optic while imaging. A higher correlation coefficient implies a greater similarity and facilitates robust reconstruction. The wavelength range over which the coefficient exceeds 0.5 thus defines the operating bandwidth. This coefficient is computed as a normalized inner product of the PSF with itself at a fixed reference wavelength. In this analysis, we set the reference wavelength to 511 nm.

The inventive metasurface imager demonstrates a large aperture size of 500 µm, which is more than four times larger in area than other works, while maintaining a low f-number of 2. Our meta-optic is polarization insensitive and enables imaging across the full visible spectrum of 400 nm-700 nm. We evaluate this operating bandwidth by computing the PSF's correlation coefficient with wavelength and defining the bandwidth as the range across which the coefficient remains above 0.5. This metric informs us how similar the PSF is as a function of wavelength, which, as explained above, is critical given that the PSF can only be experimentally calibrated at discrete wavelengths even if the broadband light is captured by the meta-optic while imaging. A higher correlation coefficient implies a greater similarity and facilitates robust reconstruction. The wavelength range over which the coefficient exceeds 0.5 thus defines the operating bandwidth. This coefficient is computed as a normalized inner product of the PSF with itself at a fixed reference wavelength. In this analysis, we set the reference wavelength to 511 nm.

Figure 6:
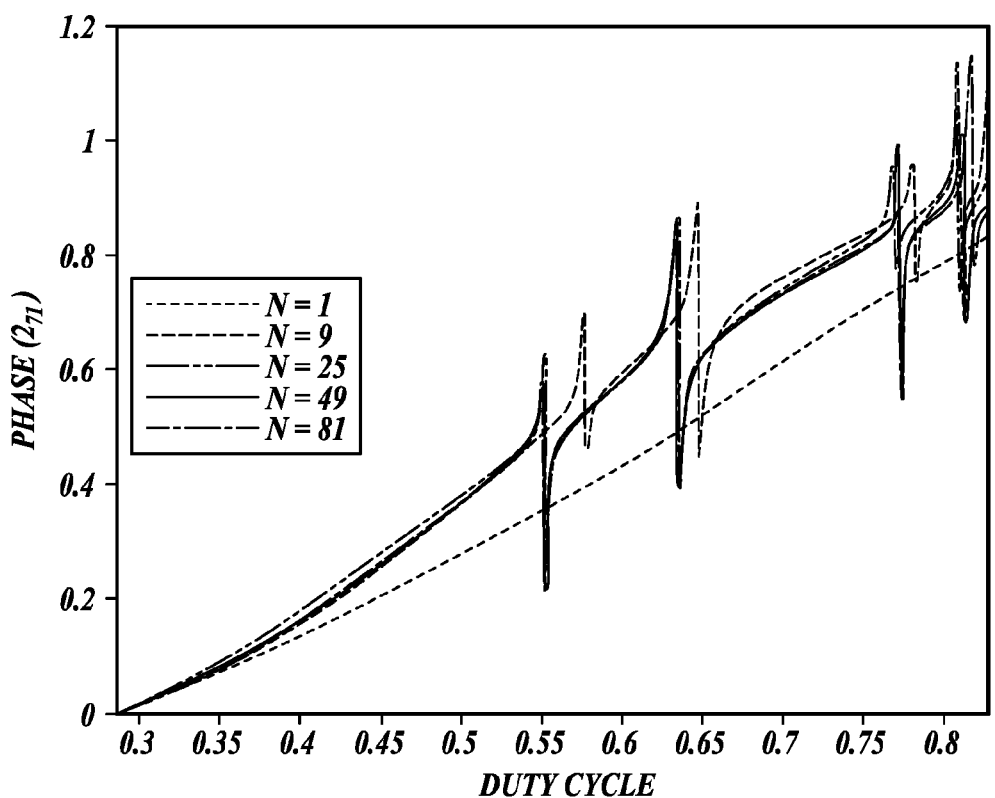
FIG. 6 illustrates metasurface scatterer simulation according to embodiments of the present technology.

FIG. 6 illustrates metasurface scatterer simulation according to embodiments of the present technology. The transmission coefficient as a function of duty cycle was calculated using rigorous coupled-wave analysis. By considering the scatterer's permittivity with only the DC Fourier component, we neglect contributions from higher order Fourier terms but still capture an approximate transmission coefficient that closely follows the response with additional Fourier terms. Here, N=1 denotes the effective index approximation-based transmission coefficient phase used in our design. The process of obtaining the results shown in FIG. 6 is described below.

Metasurface Phase Determination and Point Spread Function Calculation

Figure 7:
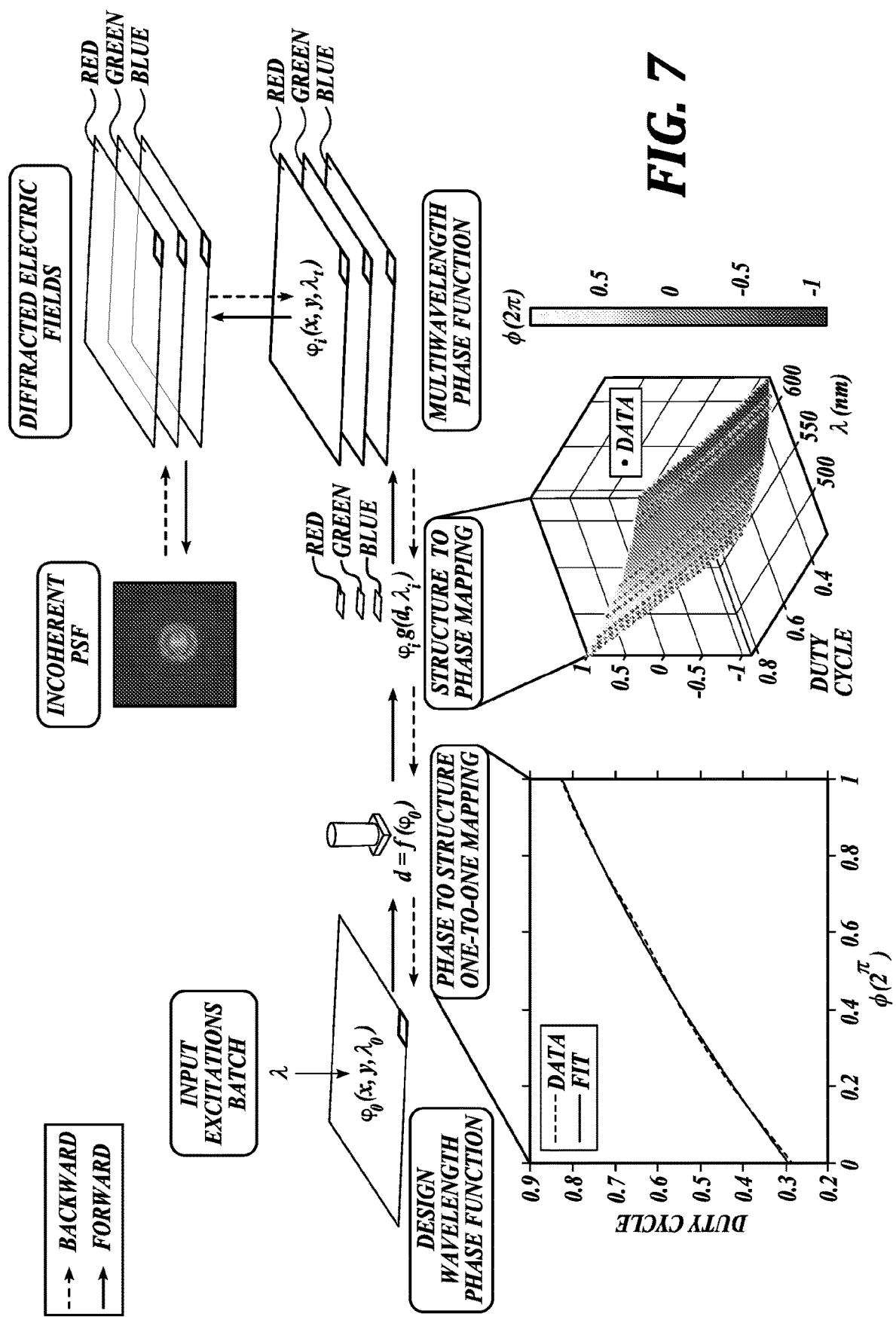
FIG. 7 illustrates a differentiable proxy-based metasurface according to embodiments of the present technology.

The inventive differentiable metasurface model approximates the optical response of the scatterers and then leverages Fourier optics for memory-efficient light propagation (FIG. 7). To design the nanoposts, we calculated transmission coefficients using rigorous coupled-wave analysis (RCWA). Our design consists of square cross section, silicon nitride (n=2.0) nanoposts with a thickness of 705 nm and a pitch of 350 nm atop a fused silica (n=1.5) substrate also with thickness 705 nm in simulation. To ensure a differentiable mapping from phase to duty cycle, the phase as a function of duty cycle must be injective. To ensure this, we employ an effective index approximation of the unit cell. While this calculates an approximate transmission coefficient by only considering the DC component of the permittivity to ensure a differentiable proxy phase, the transmission coefficient of our design does not change appreciably upon including higher Fourier orders with the exception of a few resonances. The simulated full metasurfaces were modeled by means of the band-limited angular spectrum method where we map the RCWA-computed transmission coefficient to each pixel.

To enable differentiation with respect to duty cycle, we fit this phase data to a polynomial proxy function of the form:

$$d(\phi) = \sum_{i=0}^{N} b_i \left(\frac{\phi}{2\pi}\right)^{2i} \qquad (5)$$

where d is the required duty cycle, φ is the desired phase at a position on the metasurface, and the bi's are fitted parameters. For our square nanoposts we only require expansion up to N=2. After applying this inverse mapping to determine the required physical structure, we compute the phase for the other wavelengths by means of a second proxy function that maps a combination of the nanopost duty cycle and incident wavelength to an imparted phase delay.

We model this again by fitting the pre-computed transmission coefficient of our scatterers under an effective index approximation, but this time with a polynomial of the form:

$$\phi(d, \lambda) = \sum_{i=0}^{N} \sum_{j=0}^{M} c_{ij} d^i \lambda^j \quad (6)$$

where $\lambda$ is the wavelength and N and M are the number of orders in duty cycle and wavelength respectively.

The quality of these fits is relevant for accurately modeling our metasurface. Using linear least squares, we find that the determined polynomial fits well to the underlying transmission coefficient data $C_{META}$, as is indicated by their agreement shown in FIG. 7. The computed R-squared coefficients for the inverse and forward mappings were 0.9994 and 0.9998, respectively.

The fixed parameters $C_{META}$ determine our metasurface proxy function $f_{META}$ which operates on the optimizable parameters:

$$\mathcal{P}_{META} = \{a_i \mid i = 1, \ldots, n\}.$$

which are described above as the n coefficients of the metasurface phase function.

Thus, given an input field angle $\theta$ the $f_{META}$ computes a spatially variant PSF:

$$PSF_\theta = f_{META}(\theta, \mathcal{P}_{META}, C_{META})$$

Differentiable Sensor Noise

We model the sensor noise as a per-pixel Gaussian-Poisson noise. Specifically, if $x \in [0,1]$ is the input signal at some sensor pixel location and $f_{SENSOR}(x)$ is the noisy measurement, then $$f_{SENSOR}(x) = \eta_g(x, \sigma_g) + \eta_p(x, \alpha_p)$$

where $\eta_g(x, \sigma_g) \sim N(x, \sigma^2)$ is the Gaussian noise component and $\eta_p(x, \alpha_p) \sim P(x/\alpha_p)$ is the Poisson noise component. Thus, our $f_{SENSOR}$ function is a-priori determined by the noise parameters $C_{SENSOR} = \{\sigma_g, \alpha_p\}$. We use a calibration method estimate these parameters. We determined $\sigma_g = 1 \times 10^{-5}$ and $\alpha_p = 4 \times 10^{-5}$ and we use these values for all of our optimization experiments and synthetic evaluations.

In order to employ auto-differentiation for our end-to-end optimization pipeline, the gradients are required to flow from the endpoint loss all the way back to the meta-optic. For end-to-end differentiability we thus implement every step of our image formation and deconvolution in a differentiable manner. This includes the sensor noise as well, so we utilized several techniques for incorporating differentiability into these stochastic functions. Specifically, differentiable Gaussian noise is implemented using the Reparameterization approach:

$$\eta_g(x) = x + \sigma^2 \eta_g(0, 1).$$

As gradients need to flow through x to the meta-optic parameters, moving it outside of the stochastic function ng permits differentiability. Expressing sensor noise as a differentiable step within the image formation pipeline confers another advantage in that we do not require hand-engineered regularizers in our loss function, instead our neural meta-surfaces pipeline naturally learns how to accommodate for measurement error. Traditional hand-crafted regularizers such as total variation often blur out high frequency details.

Feature-Space Deconvolution

As described above, we employ a fully differentiable neural deconvolution method $f_{DECONV}$ that utilizes a novel feature propagation scheme:

$$f_{DECONV}(\mathbf{I}) = f_{DE}(f_{Z \to W}(f_{FE}(\mathbf{I}))) \quad (7)$$

Each function component consists of optimizable parameters. Specifically, $f_{FE}$ and $f_{DE}$ both consist of convolutional neural networks (CNN) and their optimizable parameters $P_{FE}$ and $P_{DE}$ consist of neural network weights. The optimizable parameters $P_{Z \to W}$ for $f_{Z \to W}$ depend on the choice of feature propagator, for example for a Wiener Filter $P_{Z \to W}$ would consist of the SNR parameter. All of these parameters, given by $P_{DECONV} = P_{FE} \cup P_{Z \to W} \cup P_{DE}$, define our deconvolution algorithm:

$$\mathbf{O} = f_{DECONV}(\mathbf{I}, PSF, P_{DECONV}) \quad (8)$$

and all of $P_{DECONV}$ is jointly optimized together with $P_{META}$ during our neural design.

Spatially-Varying Image Formation

Figure 8:
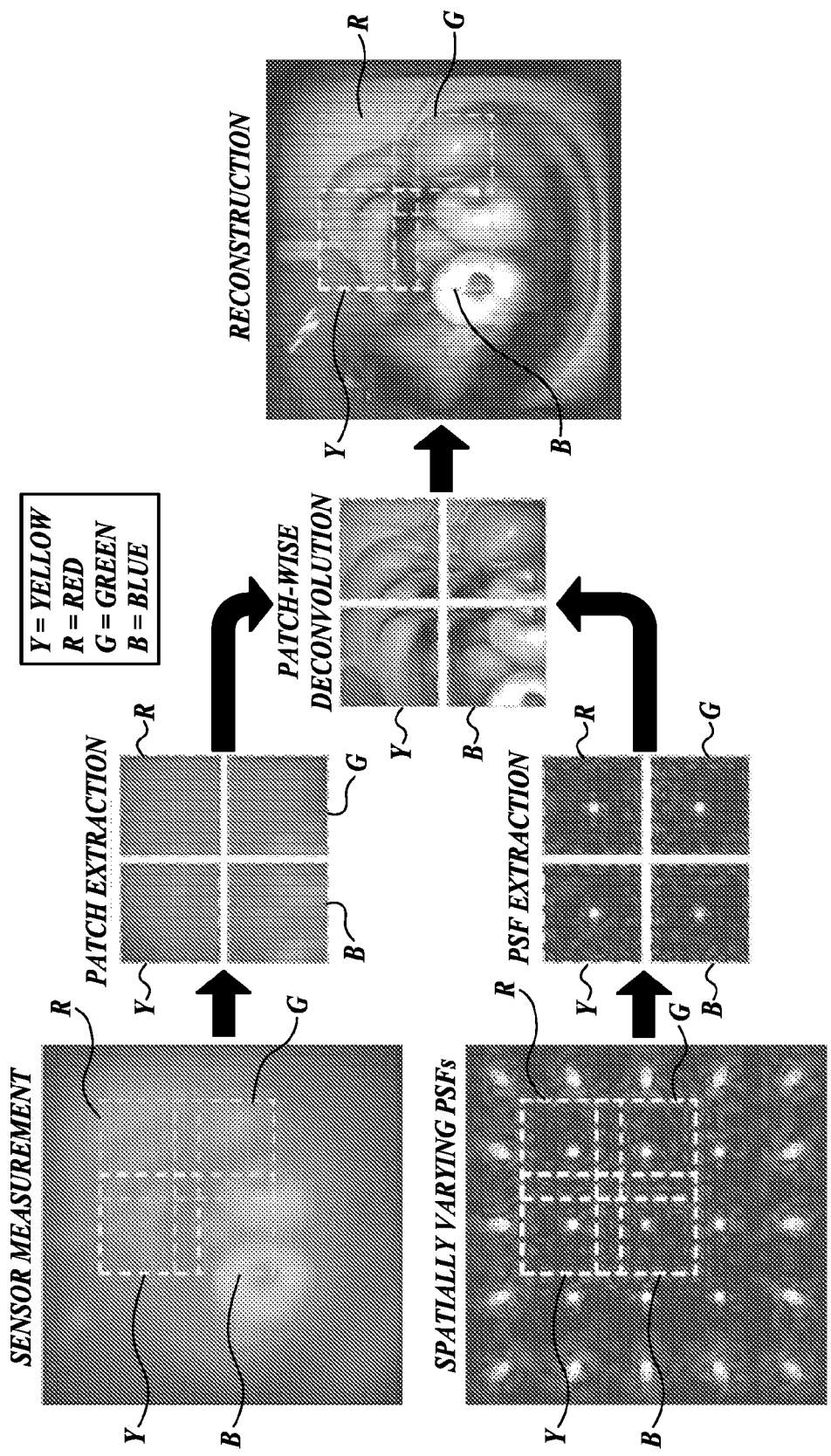
FIG. 8 illustrates shift-variant overlap and add deconvolution for experimental deployment according to embodiments of the present technology.

For any given meta-optic, deconvolution algorithms will need to handle the spatially-varying chromatic aberrations. However, deconvolving each pixel of the sensor capture in a spatially varying manner is computationally challenging for, for example, large PSF of sizes around 144 px×144 px. We turn towards patch-based deconvolution approaches such as shift-variant overlap and add. We divide up the raw sensor capture into an M×M grid of overlapping patches and we assign one PSF to each patch. Each patch is then deconvolved using our non-blind neural feature propagation deconvolution $f_{DECONV}$ and the outputs are bilinearly blended at the overlapping regions. FIG. 8 is an illustration of this procedure.

While the PSFs are fixed for inference, during design we optimize on individual patches sampled along the field of view.

1. Let $PSF_\theta$ be the PSF for a single patch of our M×M grid at field angle $\theta$. Let $PSF_{\theta+}$ be the PSF at field angle $\theta+E$, where E is a small angle. $PSF_{\theta+}$ is effectively the PSF at the outer periphery of a patch.
2. For the forward pass we use $PSF_{\theta+}$ but for the deconvolution we use $PSF_\theta$. This process acts as a regularization to the PSF design, the variance between $PSF_\theta$ and $PSF_{\theta+}$ cannot be too severe.
3. Repeat for other values of $\theta$ to cover the whole M×M grid. Compute the loss for each deconvolved patch individually and then backpropagate the total loss to all trainable parameters.

After design and fabrication, we account for mismatches between the PSF simulated by our proxy model and the experimentally measured PSF by performing a PSF calibration step. We measure the PSFs corresponding to each of the M×M patches and we finetune our deconvolution network using these measured PSFs. Note that during the finetuning procedure we use the same PSFs for both the forward pass and for deconvolution since we are not optimizing the meta-optic during inference.

Fully Differentiable Metasurface Imaging

Altogether, our metasurface imaging pipeline allows us to apply first-order stochastic gradient optimization to jointly optimize for $P_{META}$ and $P_{DECONV}$ that will minimize our user-defined endpoint loss function L. In our case, given an input RGB image I we want parameter values that will recover I with high fidelity. As such, our endpoint loss L will measure perceptual image quality between I and the recovered image O. During the end-to-end design stage our image formation is defined using the previously described offset PSF field angle scheme:

$$PSF_\theta = f_{META}(\theta, P_{META}, C_{META}), \; PSF_{\theta+} = f_{META}(\theta + E, P_{META}, C_{META}) \quad (9)$$

$$\mathbf{O}_\theta = f_{DECONV}(f_{SENSOR}(\mathbf{I}_\theta * PSF_{\theta+}, C_{SENSOR}), PSF_\theta, P_{DECONV}) \quad (10)$$

where $\mathbf{I}_\theta$ is the image patch of I corresponding to field angle $\theta$ and * is the convolution operator.

We then apply auto-differentiation optimizers to solve for the following:

$$\{\mathcal{P}^*_{META}, \mathcal{P}^*_{DECONV}\} = \underset{\{\mathcal{P}_{META}, \mathcal{P}_{DECONV}\}}{\arg\min} \sum_{i=1}^{M} \sum_\theta \mathcal{L}(O_\theta^{(i)}, I_\theta^{(i)}), \quad (11)$$

where $PSF_\theta$ is the measured PSF at field angle $\theta$ and $f_{SVOLA}$ is the shift-variant overlap and add procedure shown in FIG. S4. Using $P^*_{DECONV}$ as an initialization point, we then apply auto-differentiation again to solve for the following:

$$\mathcal{P}'^*_{DECONV} = \underset{\{\mathcal{P}_{DECONV}\}}{\arg\min} \sum_{i=1}^{M} \mathcal{L}(O'^{(i)}, I^{(i)}) \quad (12)$$

The final learned deconvolution parameters $P'^*_{DECONV}$ are used together with the learned fabricated optic for experimental use.

FIG. 7 illustrates a differentiable proxy-based metasurface according to embodiments of the present technology. To determine the metasurface phase at all simulated wavelengths, we sequentially apply differentiable inverse and forward phase map-pings. From a desired phase at the nominal wavelength, we first compute the required scatterer distribution, mapping from phase to the structure in an inverse manner. With the structure defined, we then apply the forward mapping, converting the duty cycles into phases for the multiple wavelengths used in the end-to-end-design. With the phase at each wavelength determined, we then diffract the electric fields to the image plane and we can compute the incoherent PSF by taking the modulus squared.

FIG. 8 illustrates shift-variant overlap and add deconvolution for experimental deployment according to embodiments of the present technology. We divide the raw sensor capture into a 5×5 grid of patches and we apply our neural feature propagation deconvolution to each patch. The outputs of each patch are bilinearly blended at the borders with their neighboring patches.

Figure 9:
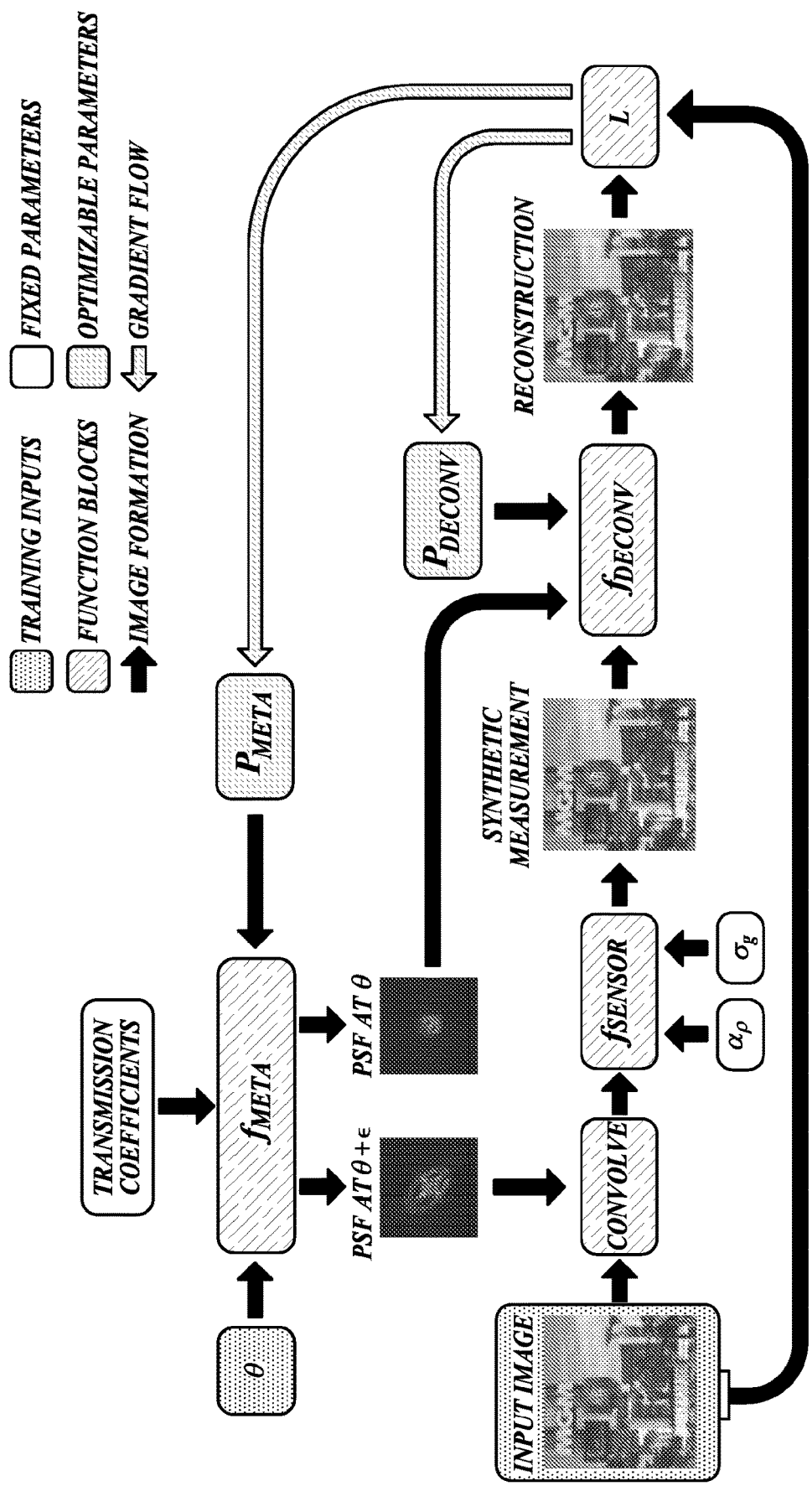
FIG. 9 illustrates design stage image formation and deconvolution according to embodiments of the present technology.

FIG. 9 illustrates design stage image formation and deconvolution according to embodiments of the present technology. We minimize PSF spatial variance within each patch during the end-to-end design stage by using different PSFs for the image formation (forward pass) and for the non-blind deconvolution. Neural feature propagation is described above in relation with equations (1)-(4).

Figure 10:
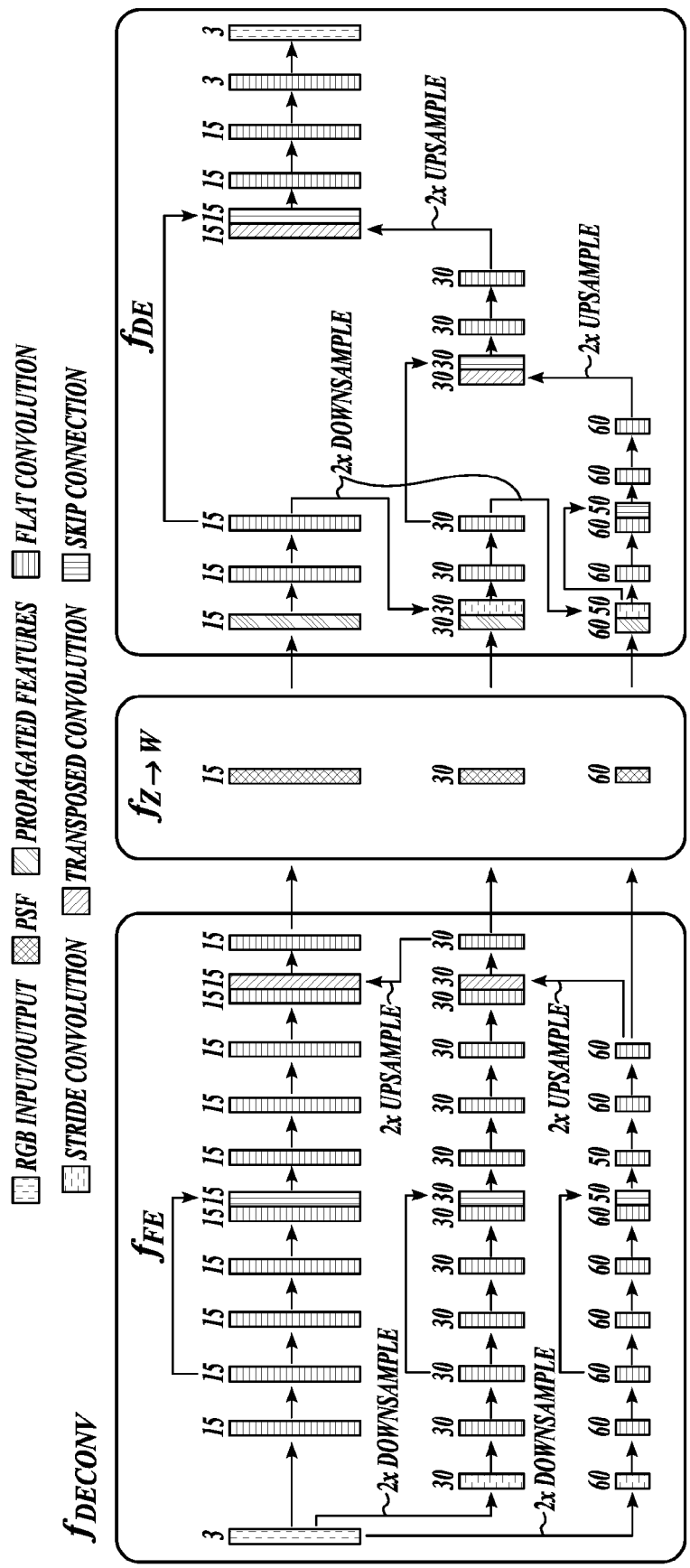
FIG. 10 illustrates architecture of neural feature propagator network according to embodiments of the present technology.

FIG. 10 illustrates architecture of neural feature propagator network according to embodiments of the present technology. The feature extractor $f_{FE}$ uses CNNs to extract features at 1, 2, 4 downsampled resolutions, which allows for learning of global and local features. The learned features are shared across the different resolutions. After extraction, the feature tensors are propagated through $f_{Z \to W}$. The PSF is used by the feature propagator for non-blind deconvolution, and the PSF is resized for different image resolutions. After feature propagation, the decoder $f_{DE}$ again applies CNNs to fuse the feature tensors into a single RGB reconstruction. Our decoder also shares information across image resolutions. Skip connections (concatenation of previous feature tensors) are employed by both $f_{FE}$ and $f_{DE}$ to better shuttle image features across the network. In the figure, the number of feature channels is shown above the operation layers.

TABLE T1

Neural feature propagator network architecture for the feature extractor. In the table, "conv-c(a)-k(b)-s(c)-LRelu" represents a convolution layer with a output channels, ab × b kernel window, using stride c, followed by a Leaky Relu ($\alpha = 0.02$) activation function. We use convT to denote transposed convolution.
Neural Feature Propagator (Feature Extractor $f_{FE}$)

| Layer Name | Layer Type | Input Layer |
| --- | --- | --- |
| Input | RGB | |
| down_l0 | conv-c15-k7-s1-LRelu | Input |
| down_l0 | conv-c15-k7-s1-LRelu | down_l0 |
| down_l1 | conv-c30-k5-s2-LRelu | down_l0 |
| down_l1 | conv-c30-k3-s1-LRelu | down_l1 |
| down_l1 | conv-c30-k3-s1-LRelu | down_l1 |
| down_l2 | conv-c60-k5-s2-LRelu | down_l1 |
| down_l2 | conv-c60-k3-s1-LRelu | down_l2 |
| down_l2 | conv-c60-k3-s1-LRelu | down_l2 |
| conv_l2_k0 | conv-c60-k3-s1-LRelu | down_l2 |
| conv_l2_k1 | conv-c60-k3-s1-LRelu | conv_l2_k0 |
| conv_l2_k2 | conv-c60-k3-s1-LRelu | Concat([conv_l2_k0, conv_l2_k1]) |
| conv_l2_k3 | conv-c60-k3-s1-LRelu | conv_l2_k2 |
| conv_l2_k4 | conv-c60-k3-s1-LRelu | conv_l2_k3 |
| conv_l2_k5 | conv-c60-k3-s1-LRelu | conv_l2_k4 |
| conv_l1_k0 | conv-c30-k3-s1-LRelu | down_l1 |
| conv_l1_k1 | conv-c30-k3-s1-LRelu | conv_l1_k0 |
| conv_l1_k2 | conv-c30-k3-s1-LRelu | Concat([conv_l1_k0, conv_l1_k1]) |
| conv_l1_k3 | conv-c30-k3-s1-LRelu | conv_l1_k2 |
| conv_l1_k4 | conv-c30-k3-s1-LRelu | conv_l1_k3 |
| conv_l1_k5 | conv-c30-k3-s1-LRelu | conv_l1_k4 |
| up_l2 | convT-c30-k2-s2-LRelu | conv_l2_k5 |
| conv_l1_k6 | conv-c30-k3-s1-LRelu | Concat([up_l2, conv_l1_k5]) |
| conv_l1_k7 | conv-c30-k3-s1-LRelu | conv_l1_k6 |
| conv_l0_k0 | conv-c15-k3-s1-LRelu | down_l0 |
| conv_l0_k1 | conv-c15-k3-s1-LRelu | conv_l0_k0 |
| conv_l0_k2 | conv-c15-k3-s1-LRelu | Concat([conv_l1_k0, conv_l0_k1]) |
| conv_l0_k3 | conv-c15-k3-s1-LRelu | conv_l0_k2 |
| conv_l0_k4 | conv-c15-k3-s1-LRelu | conv_l0_k3 |
| conv_l0_k5 | conv-c15-k3-s1-LRelu | conv_l0_k4 |

TABLE T1-continued

Neural feature propagator network architecture for
the feature extractor. In the table, "conv-c(a)-k(b)-s(c)-LRelu"
represents a convolution layer with a output channels,
ab × b kernel window, using stride c, followed by a
Leaky Relu (α = 0.02) activation function.
We use convT to denote transposed convolution.
Neural Feature Propagator (Feature Extractor $f_{FE}$)

| Layer Name | Layer Type | Input Layer |
| --- | --- | --- |
| up_l1 | convT-c15-k2-s2-LRelu | conv_l1_k5 |
| conv_l0_k6 | conv-c15-k3-s1-LRelu | Concat([up_l1, conv_l0_k5]) |
| conv_l0_k7 | conv-c15-k3-s1-LRelu | conv_l0_k6 |

TABLE T2

Neural feature propagator network architecture
for the feature propagator. This network takes in
layers from the feature extractor as input.
Neural Feature Propagator (Feature Propagator $f_{z \to w}$)

| Layer Name | Layer Type | Input Layer |
| --- | --- | --- |
| PSF_1x | RGB PSF | |
| PSF_2x | 2 × downsampled RGB PSF | |
| PSF_4x | 4 × downsampled RGB PSF | |
| fp_l0 | Feature Propagator | PSF_1x and conv_l0_k7 |
| fp_l1 | Feature Propagator | PSF_2x and conv_l1_k7 |
| fp_l2 | Feature Propagator | PSF_4x and conv_l2_k5 |

TABLE T3

Neural feature propagator network architecture for
the decoder. In the table, "conv-c(a)-k(b)-s(c)-LRelu"
represents a convolution layer with a output channels,
ab × b kernel window, using stride c, followed by a
Leaky Relu (a = 0.02) activation function. We use convT
to denote transposed convolution. This network takes
in layers from the feature propagator as input.
Neural Feature Propagator (Decoder $f_{DE}$)

| Layer Name | Layer Type | Input Layer |
| --- | --- | --- |
| conv_l0_k0 | conv-c30-k5-s1-LRelu | fp_l0 |
| conv_l0_k1 | conv-c30-k5-s1-LRelu | conv_l0_k0 |
| down_l0 | conv-c30-k5-s2-LRelu | conv_l0_k1 |
| conv_l1_k0 | conv-c60-k3-s1-LRelu | Concat([fp_l1, down_l0]) |
| conv_l1_k1 | conv-c60-k3-s1-LRelu | cony_l1_k0 |
| down_l1 | conv-c60-k3-s2-LRelu | conv_l1_k1 |
| conv_l2_k0 | conv-c120-k3-s1-LRelu | Concat([fp_l2, down_l1]) |
| conv_l2_k1 | conv-c120-k3-s1-LRelu | conv_l2_k0 |
| conv_l2_k2 | conv-c120-k3-s1-LRelu | Concat([conv_l2_k0, fp_l2, down_l1]) |
| conv_l2_k3 | conv-c120-k3-s1-LRelu | conv_l2_k2 |
| up_l2 | convT-c60-k2-s2-LRelu | conv_l2_k3 |
| conv_l1_k2 | conv-c60-k3-s1-LRelu | Concat([conv_l1_k1, up_l2]) |
| conv_l1_k3 | conv-c60-k3-s1-LRelu | conv_l1_k2 |
| up_l1 | convT-c60-k2-s2-LRelu | conv_l2_k3 |
| conv_l0_k2 | conv-c30-k5-s1-LRelu | Concat([conv_l0_k1, up_l1]) |
| Output | RGB | conv_l0_k2 |

Figure 11A:
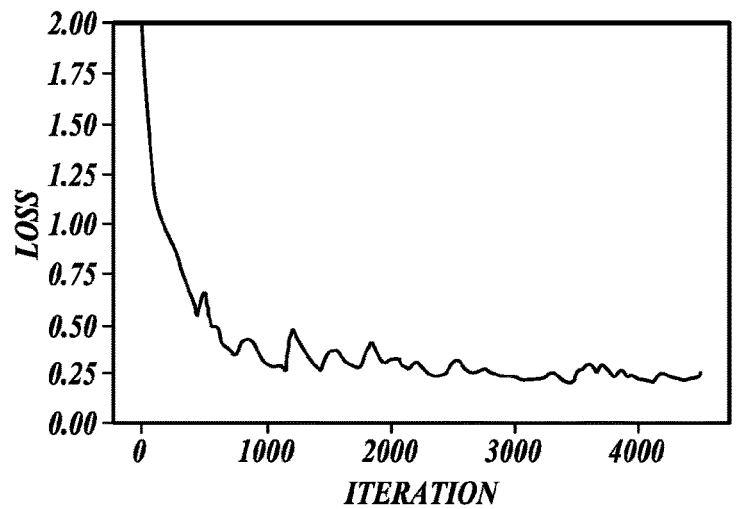
FIGS. 11A-11C illustrate perceptual metric quantities over the design optimization and finetuning runs according to embodiments of the present technology.
Figure 11B:
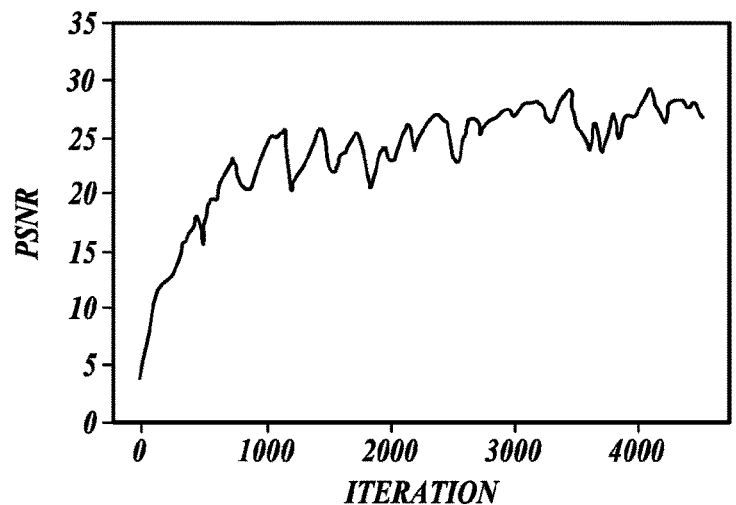
Figure 11C:
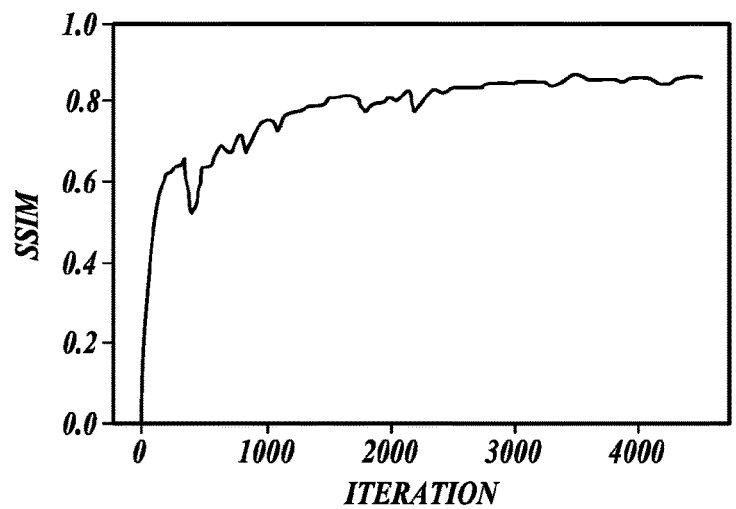

FIGS. 11A-11C illustrate perceptual metric quantities over the design optimization and finetuning runs according to embodiments of the present technology. Throughout both runs the parameters of the entire metasurface imaging pipeline converges towards a viable solution for full-color, wide field of view imaging.

Figure 12A:
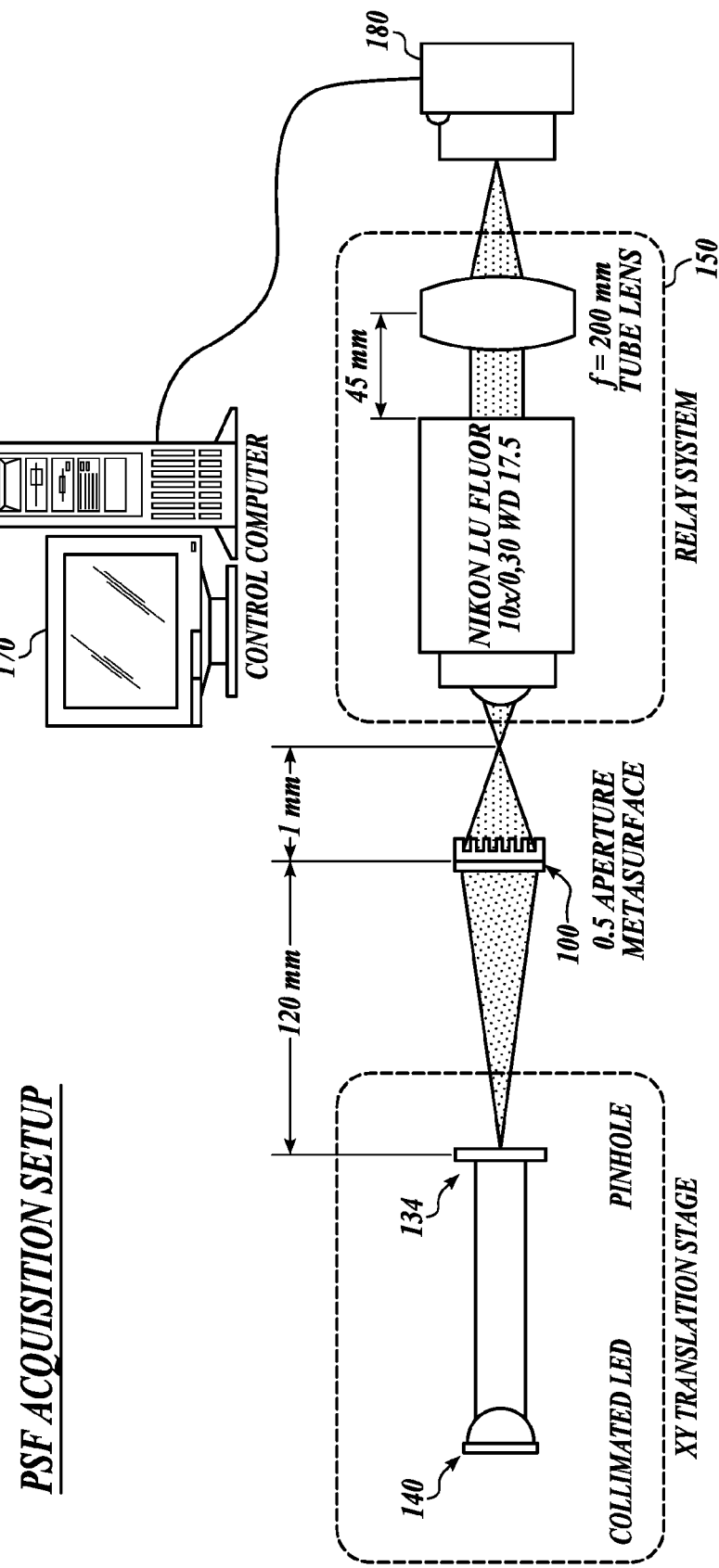
FIGS. 12A and 12B illustrate experimental imaging setup according to embodiments of the present technology.
Figure 12B:
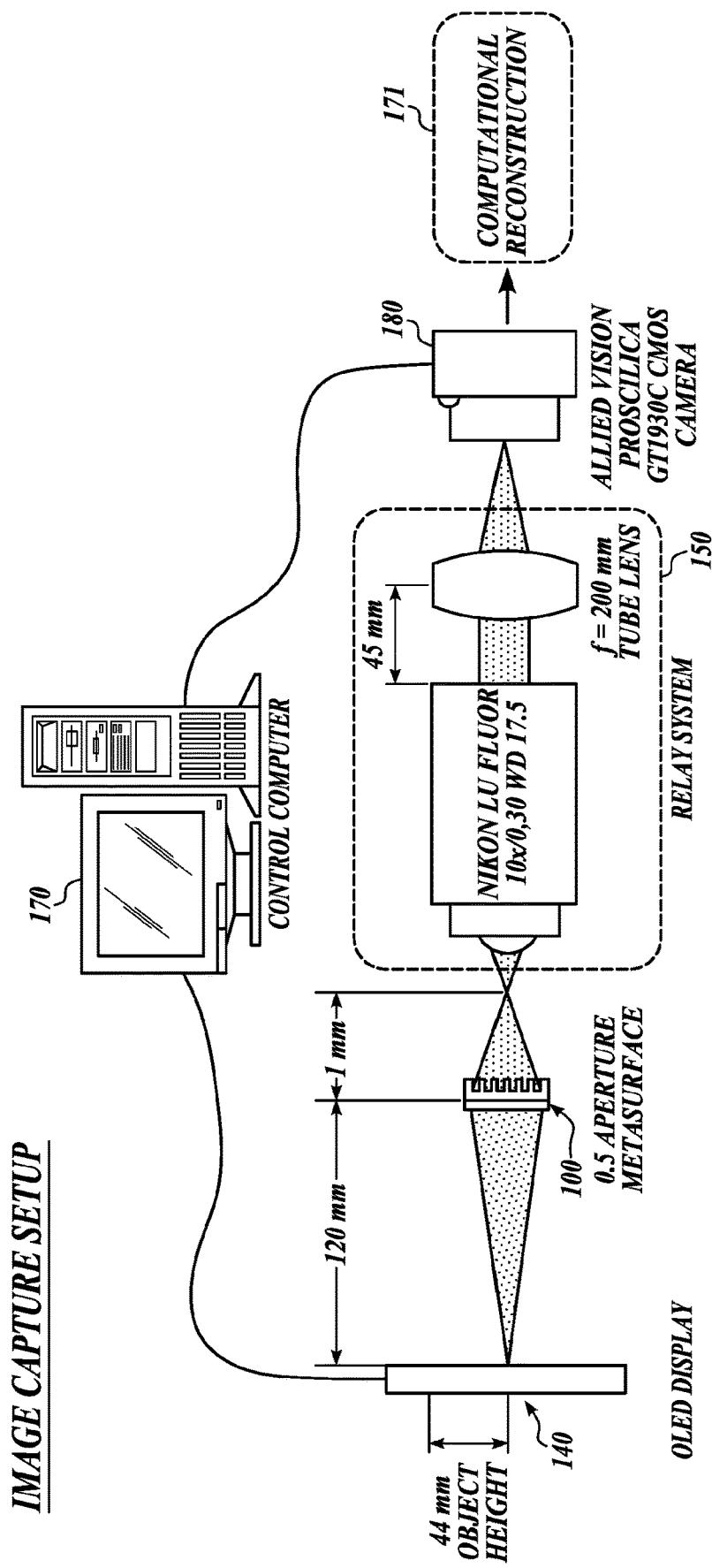

FIGS. 12A and 12B illustrate experimental imaging setup according to embodiments of the present technology. Here, we capture spatially-varying PSFs by using a movable pinhole and a laser source, with one laser for each of the RGB wavelengths. Once captured, the measured spatial PSFs are used in our deconvolution algorithm and replace the simulated PSFs. The same setup is used for acquiring images except that the pinhole and lasers are replaced with a monitor that displays images.

In particular FIG. 12A illustrates a PSF acquisition setup, and FIG. 12B illustrates an image capture setup. FIG. 12A illustrates an optical system having a source of collimated light (collimated LED) 140 that directs light through a plate having a pinhole 131. The light passing through the pinhole 131 expands as a light beam toward metasurface 100. The illustrated metasurface has an aperture of 0.5 mm, but other values are also possible.

In different embodiments, the focal field is observable by a relay system 150 (comprising a microscope or another optical element for observing the focal field). Image of the focal field may be obtained by a photo detector 180 (e.g., a camera, for example, a charge-coupled device (CCD) camera). In operation, the photodetector 180 records an image of the pinhole 131. Operation of the system may be controlled by a control computer (a controller) 170. Some examples of the functions executed the controller 170 are calculation of the reconstruction/correction parameters of the operation for different wavelength, etc.

FIG. 12B illustrates an image capture setup. In the illustrated embodiment the plate 130 and pinhole 131 are replaced by a source of collimated light 140 (OLED display) that represents an object. In operation, the printed object pattern is projected onto the metasurface 100, and may be recorded by the photodetector 180 for further analysis and/or image processing, including a computational reconstruction 171 (also referred to as a post-processing engine). In some embodiments, the post-processing engine may rely on image gradients or gradient decent method for comparing an image acquired by the system (a first image) or a ground truth image to a deconvolved version of the first image. In some embodiment, the post-processing engine 171 is a machine learning engine.

The dimensions shown in FIGS. 12A and 12B are for illustration only. Other dimensions are possible in different embodiments.

Figure 13:
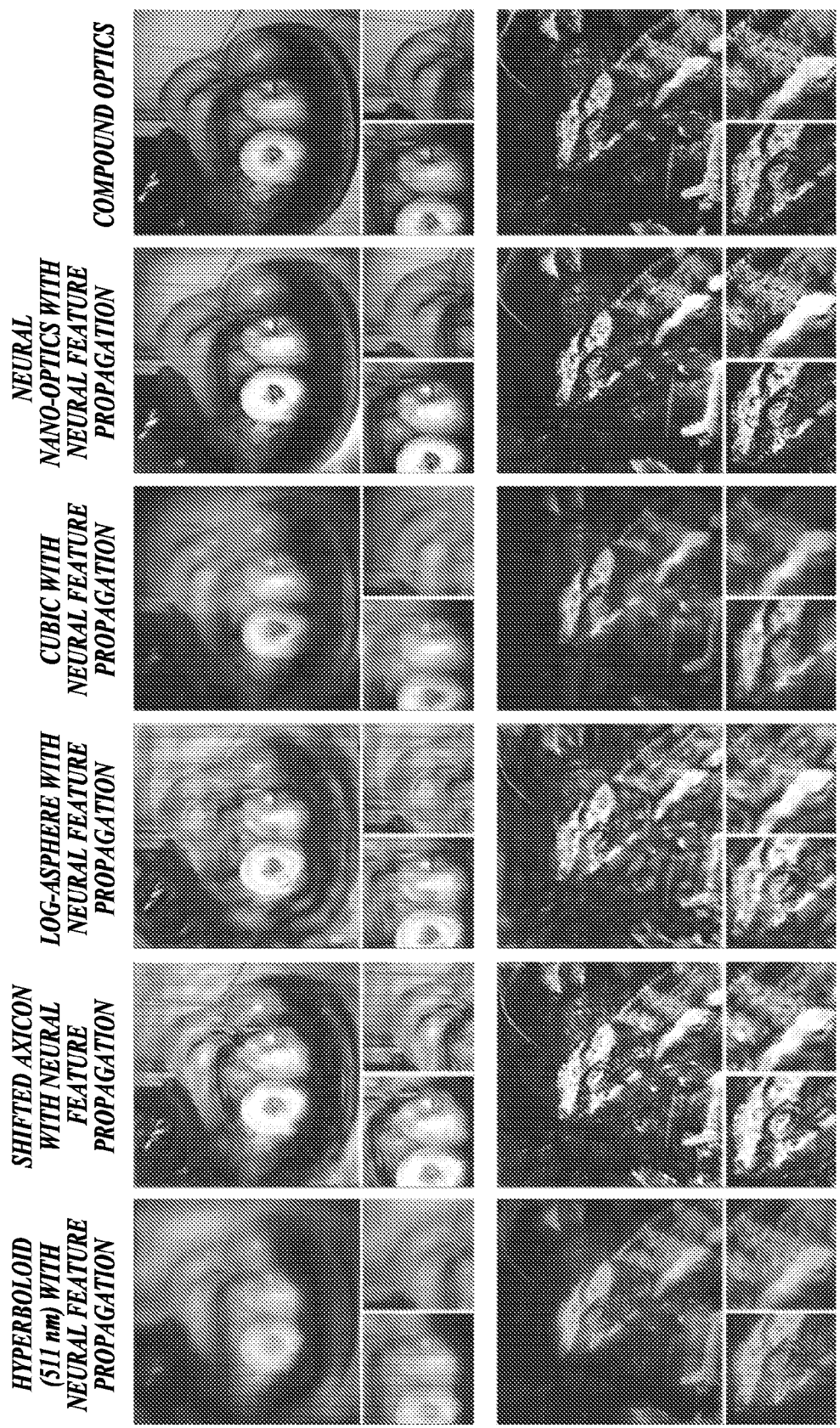
FIG. 13 illustrates qualitative comparison for different meta-optics designs using experimental captures according to embodiments of the present technology.
Figure 13:
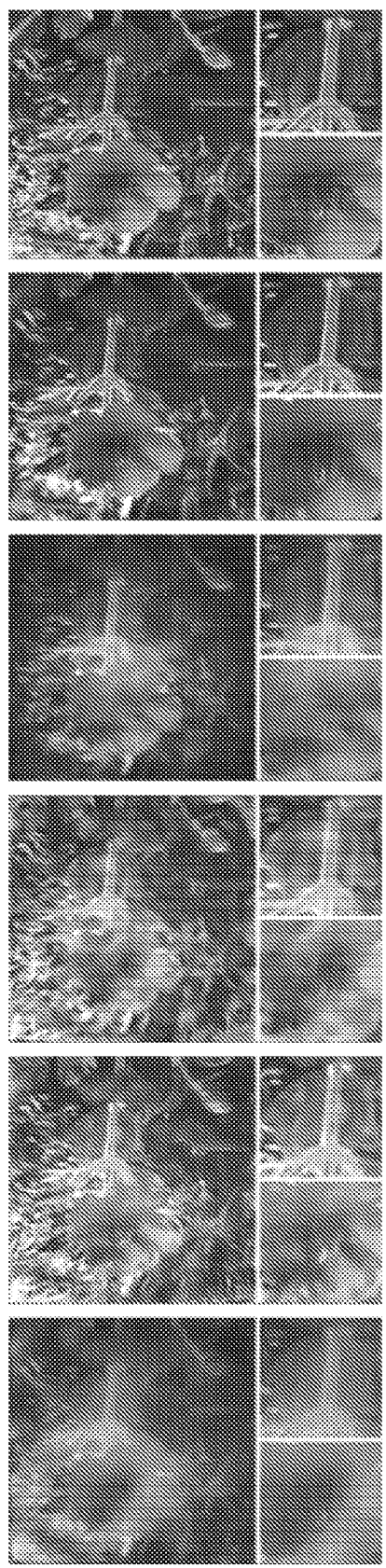

FIG. 13 illustrates qualitative comparison for different meta-optics designs using experimental captures according to embodiments of the present technology. The aberrations of the baseline meta-optics designs are too severe to allow for high quality full-color imaging, although our inventive neural feature propagation does manage to recover some detail with these designs. The end-to-end optimized neural meta-optic is the only design that successfully facilitates downstream deconvolution using our neural feature propagation.

Figure 14:
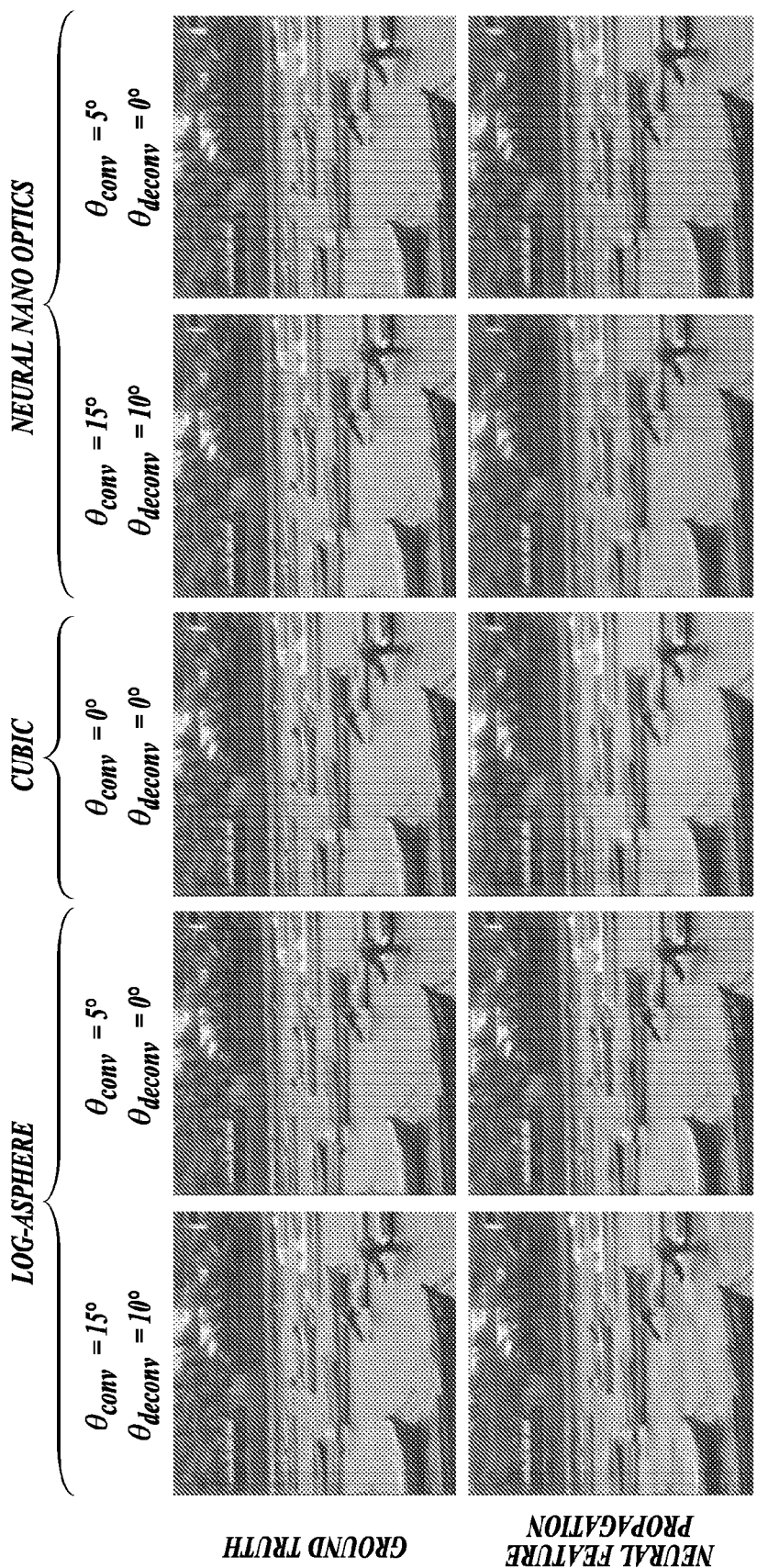
FIG. 14 illustrates qualitative comparison between deconvolution algorithms in simulation according to embodiments of the present technology.
Figure 14:
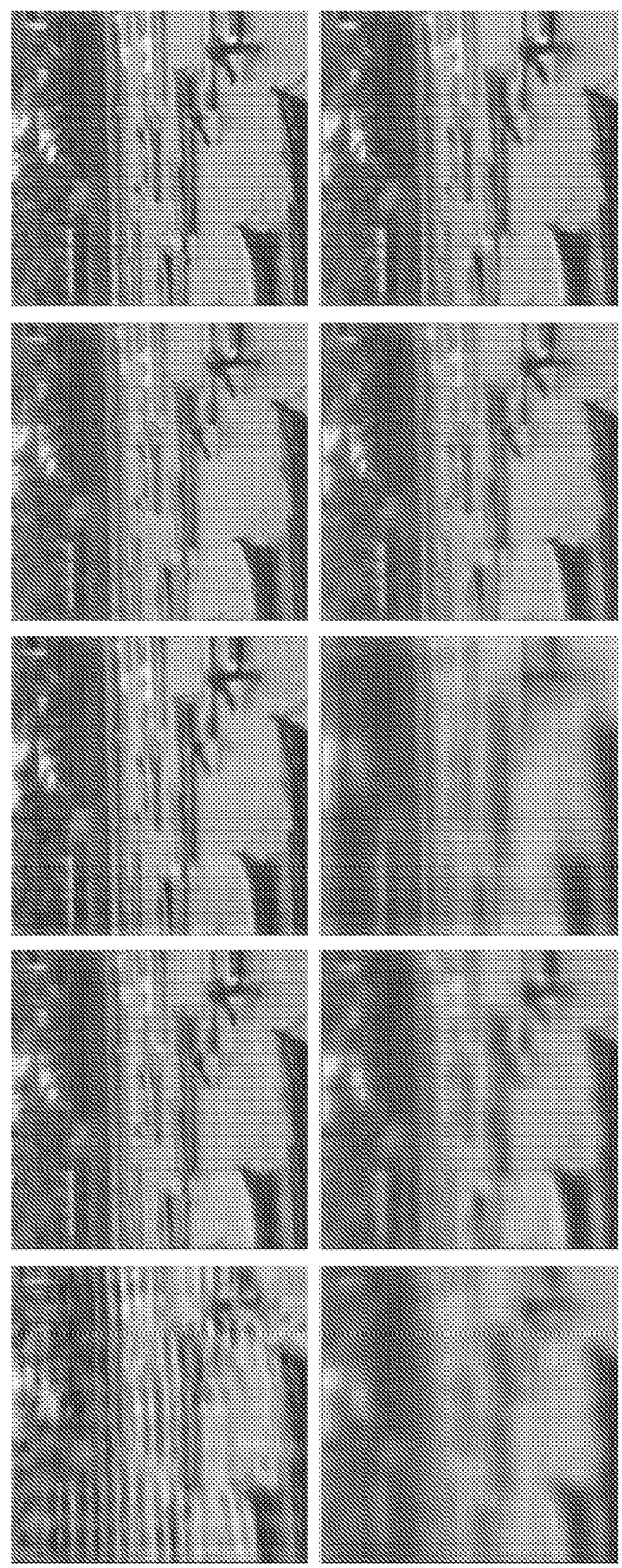
Figure 14:
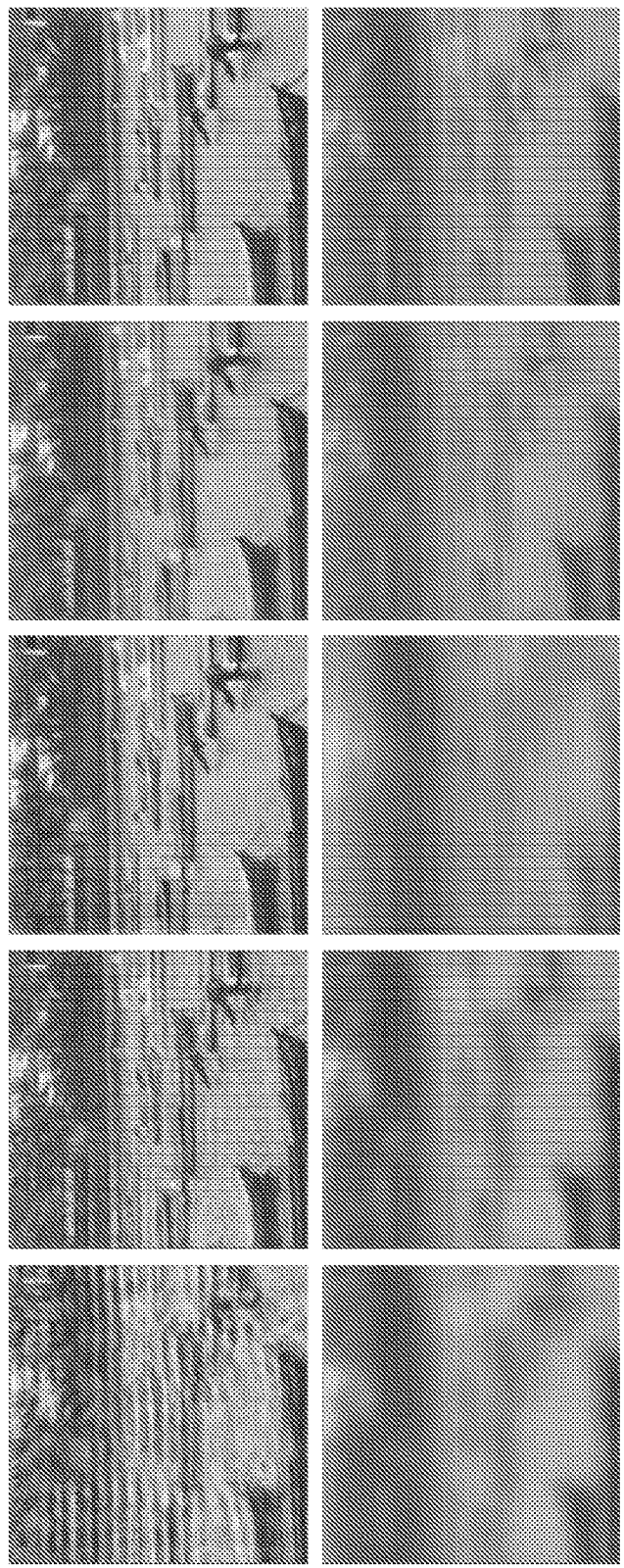

FIG. 14 illustrates qualitative comparison between deconvolution algorithms in simulation according to embodiments of the present technology. Many of the deconvolution algorithms suffer certain shortcomings. For example, Wiener filtering exacerbates sensor noise. Richardson-Lucy and ADMM both fail to recover sharp fine details. Kupyn et al. falls into a local minima where it avoids doing any deblurring. Son et al. does not employ a feature extractor and consequently does not reach the same level of performance as our method. Neural feature propagation recovers high frequency content and reproduces accurate color while mitigating sensor noise.

Figure 15:
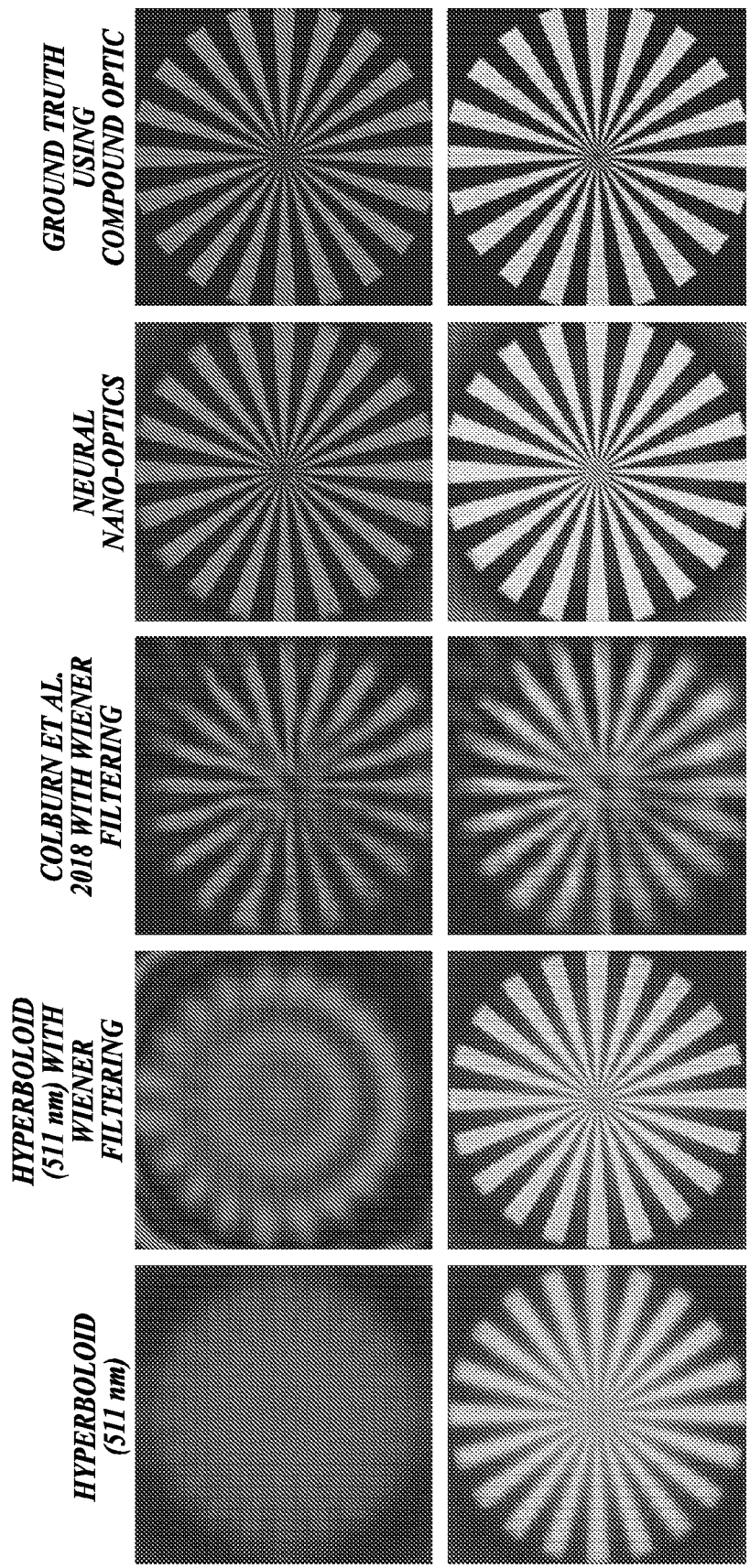
FIG. 15 illustrates qualitative results for reconstructions of the Siemens Star chart with corresponding MTF plots according to embodiments of the present technology.
Figure 15:
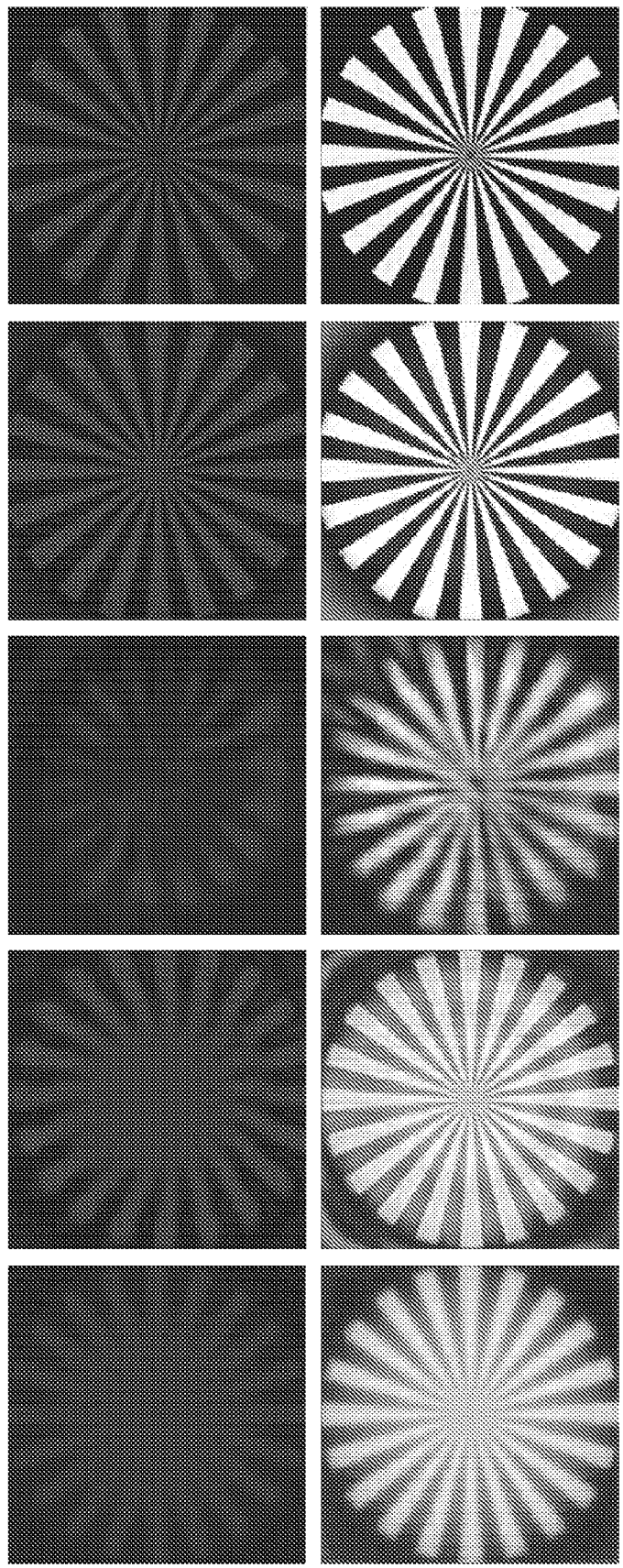

FIG. 15 illustrates qualitative results for reconstructions of the Siemens Star chart with corresponding MTF plots according to embodiments of the present technology. The reconstruction with our neural nano-optic imager accurately matches the MTF of the ground truth Siemens Star whereas the MTFs of the other methods lose significant spatial resolution.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

What is claimed is:

1. A method for acquiring images by an imaging system comprising a metalens, the method comprising:
    illuminating the metalens;
    acquiring light passing through the metalens as a first image by an image sensor;
    processing the first image into a second image that is a deconvolved version of the first image by a post-processing engine; and
    calibrating the metalens based on a point spread function (PSF), wherein calibrating comprises phase function o as a function of distance r from an optical axis:

$$\phi(r) = \sum_{i=0}^{n} a_i \left(\frac{r}{R}\right)^{2i}$$

where $\{\alpha_0, \ldots \alpha_n\}$ are optimizable coefficients, R is a phase mask radius, and n is a number of polynomial terms, wherein the metalens comprises a plurality of nanoposts carried by a substrate.

2. The method of claim 1, wherein the post-processing engine is a neural network engine.

3. The method of claim 1, further comprising calibrating the metalens based on a point spread function (PSF).

4. The method of claim 1, wherein calibrating the metalens based on a point spread function (PSF) is based on artificial images.

5. The method of claim 1, wherein the nanoposts comprise silicon nitride.

6. The method of claim 5, wherein the nanoposts have a diameter (d) in a range from 100 nm to 300 nm and a height (t) in a range from 500 nm to 800 nm.

7. A method for acquiring images by an imaging system comprising a metalens, the method comprising,
    illuminating the metalens;
    acquiring light passing through the metalens as a first image by an image sensor;
    processing the first image into a second image that is a deconvolved version of the first image by a post-processing engine, wherein the post-processing engine comprises a feature deconvolution block;
    comparing a ground truth image to the second image by the post-processing engine;
    determining image gradients based on comparing the ground truth image to the second image; and
    training the feature deconvolution block based on the image gradients,
    wherein the metalens comprises a plurality of nanoposts carried by a substrate, and
    wherein the feature deconvolution block is at least in part based on a neural deconvolution ($f_{DECONV}$) that utilizes a feature propagation scheme ($f_{z \to w}$):

$$f_{DECONV}(I) = f_{DE}(f_{z \to w}(f_{FE}(I)))$$

where $f_{FE}$ and $f_{DE}$ both comprise convolutional neural networks (CNN) and their optimizable parameters, and I refers to the first image.

8. An imaging system, comprising:
    a calibrated metalens comprising a plurality of nanoposts carried by a substrate, wherein the metalens is calibrated based on a point spread function (PSF) that comprises phase function φ as a function of distance r from an optical axis:

$$\phi(r) = \sum_{i=0}^{n} a_i \left(\frac{r}{R}\right)^{2i}$$

where $\{\alpha_0, \ldots \alpha_n\}$ and are optimizable coefficients, R is a phase mask radius, and n is a number of polynomial terms;
    a source of light configured to emit light toward the metalens;
    an image sensor configured to acquire light passing through the metalens as a first image; and
    a post-processing engine configured for processing the first image into a second image that is a deconvolved version of the first image.

9. The system of claim 8, wherein the post-processing engine is further configured for comparing a ground truth image to the second image.

10. The system of claim 9, wherein comparing the ground truth image to the second image comprises determining image gradients.

11. The system of claim 10, wherein processing the first image light into the second image comprises a gradient decent method.

12. The system of claim 8 wherein the post-processing engine is a machine learning engine.

13. The system of claim 8, wherein the metalens is configured for calibration based on experimental point spread functions (PSFs).

14. The system of claim 8, wherein the nanoposts comprise silicon nitride.

15. The system of claim 8, wherein the nanoposts have a diameter (d) in a range from 100 nm to 300 nm and a height (t) in a range from 500 nm to 800 nm.

* * * * *